United States Patent
Mirtsch

[11] Patent Number: 5,887,470
[45] Date of Patent: Mar. 30, 1999

[54] METHOD AND APPARATUS FOR DENT PROFILING

[76] Inventor: Frank Mirtsch, Potsdamer Strabe 18 a, 14513 Teltow, Germany

[21] Appl. No.: 539,538

[22] Filed: Jun. 12, 1998

[30] Foreign Application Priority Data

| Apr. 6, 1993 | [DE] | Germany | 43 11978-C1 |
| Jan. 25, 1994 | [DE] | Germany | 44 01974-A1 |
| Apr. 3, 1994 | [WO] | WIPO | PCT/EP94/01043 |

[51] Int. Cl.$^6$ .................................................. B21D 39/08
[52] U.S. Cl. .................................. 72/57; 72/421; 72/196
[58] Field of Search .................................. 72/57, 58, 62, 72/91, 184, 190, 196, 421

[56] References Cited

U.S. PATENT DOCUMENTS

| 2,213,568 | 9/1940 | Rohland | 72/57 |
| 2,960,141 | 11/1960 | Rutter | 72/62 |
| 3,583,187 | 6/1971 | Kontranowski | 72/58 |
| 3,685,331 | 8/1972 | Marcovitch | 72/196 |
| 3,706,218 | 12/1972 | Elmer . | |
| 4,027,517 | 6/1977 | Bodnar . | |
| 4,059,000 | 11/1977 | Bodnar | 72/196 |
| 4,723,430 | 2/1988 | Hahn | 72/62 |
| 5,419,791 | 5/1995 | Folmer | 72/57 |

FOREIGN PATENT DOCUMENTS

| 2527301 | 11/1983 | France . |
| 1552017 | 11/1970 | Germany . |
| 1752001 | 4/1971 | Germany . |
| 2557216 | 6/1977 | Germany . |
| 1602489 | 12/1977 | Germany . |

*Primary Examiner*—Lowell A. Larson
*Attorney, Agent, or Firm*—Farjami & Zarrabian

[57] ABSTRACT

The present invention discloses a process to produce staggered dent profiled material sheets in response to the application of either excess pressure or underpressure. A rectangular, staggered dent-profiled structure is achieved when a material sheet, in curved form, is supported by regularly spaced-apart support elements and then excess pressure or underpressure is applied. As a result of the pressure dents appear on the material sheet in the direction of the support elements as well as by self-organization. Hexagonal dent profiled structures are generated when flexible support elements are used. The dent profiling can result from a semi-continuous or continuous operation. Segmentwise dent profiling can be achieved when the material sheet is successively bent in peripheral direction over a segment of regularly spaced-apart support elements and then dent profiled under pressure. Continuous operation is achieved when only a small segment, comprising of two or more individual dents, is successively dented in peripheral direction. The continuous operation occurs because the material sheet repeatedly dent profiles itself over the entire surface of the material sheet, thus permitting continuous dent-profiling. The resulting dent-profiling of the present invention enhances many beneficial characteristics of the material sheets, such as stiffness, smoothness, heat transfer, and acoustic qualities, without requiring use of a sophisticated mold or complex machinery.

72 Claims, 19 Drawing Sheets

METHOD AND APPARATUS FOR DENT PROFILING

BACKGROUND OF THE INVENTION

This is a U.S. national stage patent application based on International Patent Application PCT/EP94/01043, filed on Apr. 3, 1994 and claiming priority dates of Apr. 6, 1993 (filing date of German patent DE 43-11978-C1) and Jan. 25, 1994 (filing date of German patent DE 44-01974-A1).

1. Field of the Invention

The present invention discloses method and apparatus for a dent stiffening process for sheet material or foil in which the wall is curved at regular distances.

2. Background Art

For economic and material reduction purposes thin-walled equipment or components are required in numerous technical applications which nevertheless have to have good strength, or shape stability. As these equipment are often component parts utilized in energy and environmental related applications, the walls should ideally have favorable inflow and heat-transmission properties. For weight and economic reasons, thin-walled and dimensionally stable constructions are also required in the packaging, design, interior fittings and building trades. In addition to structural rigidity, foil or thin-walled equipment should also have good optical features.

There are numerous known deformation processes which produce thin-walled materials with an increased structural rigidity. A well-known example is the beaded seam in cans or drums. Beads have the disadvantage that they only achieve a one-dimensional structural rigidity. When a multi-dimensional structural rigidity is required, the process requires sophisticated multi-dimensional matrix molds.

One drawback of the present profiling technology is that normally the wall deformation is achieved by mechanical means, where rolling or impressing is applied, or by hydraulic means, where pressure is put on a matrix. This alters the wall thickness while the original smooth wall surface quality is degraded. Only when the mold has a smooth surface, which normally means that its manufacture was very sophisticated, can a smooth surface of the deformed wall be achieved.

It is known from published German patent application # DE-OS 25 57 215 that there is a hydraulic molding technology in which thin-walled tubes or cylindrical containers obtain a uniformly staggered dent structure. According to that patent, the interior cylindrical walls are supported by thrust rings or a helix and then excess pressure is externally applied to achieve the dent deformation. In this type of hydraulic profiling technology, which is quasi-exempt from mechanical contact, a high quality surface finish is achieved. The uniformly staggered dent structure of the tube walls results in an increase in the rigidity compared to the non-deformed smooth wall.

This hydraulic dent profiling process does, however, have considerable disadvantages. As this process is limited to tube and cylinder walls, it is not possible to produce large dent-profiled sheet metal or foil with variable, geometric dimensions in the dented structure. Another disadvantage of this dent profiling process is that in order to bend sheet metal into a cylindrical form with perfect roundness, the two-cylinder rounding machining, which is the best known method, is used. (In this method, sheet metal is rolled over a rigid roller, which presses on a flexible bottom roller. This method is described in, for example, German patent nos. 1602489, 1752001 and 1552017.) This well-known and old twin-cylinder rounding method is more suitable for the production of cylindrical building components requiring no structured walls. When structured and cylindrical components are to be manufactured by the twin-cylinder rounding method, the structured molds are expensive and the surface quality of the raw materials is severely degraded due to the strong mechanical deformation process.

SUMMARY OF THE INVENTION

According to the present invention, thin sheet metal and foil with multi-dimensional staggered dent structures can be manufactured by simple mechanical devices, producing material that can be used in a variety of industrial applications. Improved multi-dimensional structural rigidity in dent-profiled components is achieved.

The problem is solved in that the sheet metal, which is arched over the regularly spaced supporting elements, is successively dent-profiled. The pressure needed to cause dent formation (active dent pressure) should be lower than the defensive rigidity of the fold of every dent formed spontaneously. The direction of the dent profiling is parallel to the support elements.

Dent profiling is hydraulically achieved with a fluid pressure medium, or pneumatically with a gaseous pressure medium, or by means of an elastic, or flexible or otherwise compact pressure medium. The successive sequence of the dent profiling is achieved by a continuous or gradual (segment-wise) machining operation. When pressure is applied with liquid or gaseous pressure mediums, a sealing on the edge of the respective formed surface is applied. The buckling pressure can be applied as excess pressure or underpressure. Various buckling pressure applications can be combined.

The regularly spaced support elements are ideally in the form of a rigid or flexible helix, rings, discs or other elements with serpentine or continuous zigzag patterns in the peripheral direction.

One of the advantages gained through the present invention is that thin walls or foil can be dent-profiled in a semi-continuous or continuous manufacturing process, so that in this way large surfaced and endless material sheets with enhanced multi-dimensional rigidity can be produced, despite thin walls. No expensive stamping molds are required for this manufacturing process. The advantages result from the following principal:

When support elements, e.g. regularly spaced support rings or support helixes are used to dent-profile cylindrical cylinders or coiled sheet metal, or foil, whereby a co-axial external excess pressure and/or internal underpressure is applied, the structure of the dent independently repeats itself over the entire surface of the cylinder wall. Research of segment-like dent profiling operations has confirmed that in order to achieve uniform and staggered dents, the entire cylinder circumference does not have to be formed simultaneously. The invention provides for only individual segments to be successively dented in the peripheral direction. However, the individual segment pressurized can comprise two or more individual dents in the peripheral direction.

The advantages of the present invention are achieved in that the sheet material to be structured is arched over a segment of the support roller, on which regularly spaced support elements are placed, then successively pressed, segment for segment, by externally applied excess pressure. This results in a considerable increase in the productivity of the dent profiling process.

It is important to differentiate this method from the so-called deep-draw method, whereby the material is deformed and flows. In the deep-draw method, the surface size is considerably increased as a result of the drawing process. With the present invention, there is hardly any alteration to the surface size. Buckling can occur, when the buckling pressure is sufficient to cause an indentation. In addition, the pressure must be too low to indent the relatively rigid edge of the dents that are spontaneously formed in feed direction. The dent edge resists the deformation. By applying further feed motion the denting pressure finds an area in the surface with a low resistance. A new dent emerges with an identical resistant edge. The previously described process repeats itself. Accordingly new dents are successively formed. As a result, the invention requires no support to form dent edges in the feed direction, i.e. a series of uniformly distributed dents spontaneously appear on the curved material. The dents are formed on the thin wall segment and are in a staggered position to those dents formed in the initial indentation process. A honeycomb structure emerges with a relatively high transverse strength in every direction. When regularly spaced rings or helix are used as support elements staggered quadrangular dents occur. The dent size depends on the diameter of the support roller and the axial spacing distance of the support elements.

The depth of the dent in the elastic denting process is self-regulating and depends largely on the width of the dent and curvature radius of the regularly spaced support elements during the denting process. The depth of the dent can further be increased when the deformation temperature is boosted into the elastic/plastic transition region during the process, e.g. by heating up the material sheet to be processed. This boosting of the temperature can be achieved by applying a pressure medium or, in the case of metallic material sheets, by means of electric currents.

Another advantage of the invention is that because of the regularly spaced support elements, which may have a serpentine or zigzag form in the peripheral direction, hexagonal or pentagonal shaped structures can be manufactured on the dented thin-walled material. These multi-cornered structures have the advantage over quadrangled structures in that, for symmetrical reasons, a practically identical structural rigidity in all directions is achieved. Experimental studies have confirmed that these multi-cornered structures are preferentially formed during the dent process. When flexible and regularly spaced support elements are used, which can be shifted in an axial direction, the flexible supports independently form zigzags.

This shifting is caused by the tensile stress and compressive stress areas in the dented wall which attempt to equalize themselves. The shape of the hexagonal or pentagonal dent structure is related to the following parameters: flexibility of the supporting elements, dent pressure and the deformation capacities of the various materials used.

For geometrical reasons hexagonally shaped dent structures are formed when cylindrical supports or a support roller with zigzag revolving support elements are used. In contrast preferentially pentagonal or hexagonal dent structures are formed when the support roller has a spherical or shell shape. It is known, for example, that for geometric reasons a spherical surface cannot be built up of equal-sized hexagonals.

In accordance with the invention flexible support elements, preferably bands or rings made of elastomers, plastic, metal as well as linkages (chains) or even helix which have a circular, oval, quadrangular, triangular or trapezoidal cross-sectional area are used. In order for the flexible supports to move axially on the support roller on the one hand, and on the other hand to be held in place at regular intervals, the invention allows for highly elastic sleeves, i.e. made from elastomer, soft plastics or metallic cloth to be mounted axially and placed between the supports. Alternatively the support elements can also be held in place by revolving, flat grooves in the cylinder roller. Additional application methods are also possible.

In a further favorable design, the regularly spaced flexible or rigid rings or helix, which are affixed to the support roller, are used as support elements. Flexible discs, which are inserted into the support roller at regular intervals, can also be used as support elements.

The dent deformation with flexible support elements can result in an irregular zigzag pattern, so that the hexagonal structures are not uniform. Furthermore, elastic support elements compress slightly during the dent deformation process. When this is not desired the invention allows for rigid or only slightly flexible support elements to be used which have a defined zigzag or serpentine form. In this way, defined, reproducible hexagonal structures can be achieved during the dent deformation process. Due to the invention, preference should be given to those zigzag and serpentine forms in the support elements which ideally independently would adjust themselves to the elastic support elements.

The special advantages gained from the invention also means that the dent deformation of thin walls is no longer limited to the piece-wise manufacturing of cylindrical walls. As only one segment of the support roller is required for the successive dent deformation of the sheet material, the invention allows for semi-continuous or continuous dent deformations for the manufacture of quasi non-intermittent foil or strips. The productivity of the dent-profiling process can be greatly increased.

In accordance with the invention a "quasi" non-intermittent manufacture of dent-profiled strips can be achieved in that sheet metal or foil is transported over a support roller to which revolving support rings or helix are attached, and then dented by means of pressure from an exterior flexible pressure collar. This process is progressive. When the pressure collar is unpressurized the sheet material is advanced to a new segment. When the new segment of the sheet material is in place, the dent structures are then hydraulically impressed by the pressurizing of the pressure collar.

According to the invention, the pressure collar may also have a structural surface which will be complementary to the resulting profile of the sheet material. The pressure collar is preferably made of an elastic material. Although this is a mechanical rather than a hydraulic production process, it is not comparable to the traditional compression molding process, where the material is pressed into form in a plastic state. This is not the case in the invention. Here the mechanical indentations are formed through a denting process which derives from a curvature of the strips, the support rings, the support helix on the inside of the strip, as well as a specially dent-profiled shape of the surface of the pressure collar. The dented surface of the pressure collar should ideally have a structure which independently results in an image reflected structure when hydraulic dent profiling takes place. The surface created in this way has the effect as if numerous, separate hydraulic pressure elements are utilized according to the dent-profile regularities described above.

Another advantage of the invention provides for a continuously working mechanical dent process. Instead of a pressure collar with a dent profile-like structure, a flexible profile band is applied which has tightly spaced supporting rollers on one side and staggered knobs, preferably made of ebonite, on the other side. The staggered knobs are affixed in such a way that they correspond to the dent indentations of the resulting dented structure.

The industrial costs for a continuous denting process can be decreased further in that in accordance with the invention, flexible pressure rollers or pneumatic rollers are used for the dent-profiling process. Hereby the material sheet to be formed, which is curved over the support roller, which in turn has supporting elements placed at regular intervals, is pressed by the pressure roller. The flexible pressure roller comprises an elastic cylindrical pressure jacket, preferably made of an elastomeric material. The pressing power can be controlled or regulated.

In accordance with the invention, a flexible or pneumatic, profiled, preferably knobbed pressure roller can also be used, whereby the staggered knobs correspond to the dent indentations of the dented material. The advantage is that the pressure roller simultaneously presses a segment, with two or more dents, into the material sheet in the circumferential direction.

Furthermore, rigid pressure rollers with staggered, rigid or flexible knobs can be implemented. This is preferable for dent profiling of thick sheet metal or bands which require comparably high deformation pressure. Although the knobs press on the material sheets, it does principally represent a dent profiling process. However, the surface of the material to be deformed is degraded by the pressure of the rigid, knobbed pressure roller compared to the case in a flexible or pneumatic pressure roller. The buckling pressure required is reduced when, according to the invention, the dent profiling of the material is carried out at an increased temperature.

The dent deformation by means of staggered knobs has, compared to hydraulic dent deformation, the advantage that the geometrical form of the dent structure can be variably adjusted. The support rollers can be used with flexible or rigid support elements.

A further advantage of the invention is the application of two or more pressure rollers. For example, the first pressure roller, equipped with rigid knobs, produces rough dent structures, while the following, flexible pressure rollers form the required dent troughs and equalize any unevenness that might occur in the bulge troughs. A reversed sequence of the pressure rollers also has advantages. According to the invention, zigzag shaped, serpentine shaped or other periodically revolving support elements can be used for the dent profiling process. Only minimal deformation of the support elements occurs as they are adjusted to the rotation line of the multi-dimensional staggered dent structures.

Another advantage of the invention's design concerns the manufacture of pipes, especially pipes made from extrusion or extendible (plastic) or rolled or drawn (metal). The indentation in the plastic is only permanent when it surpasses the restoration capabilities of the material. This applies to all materials.

Single or multiple helical support elements can be used, which synchronously rotate with the axial transport speed of the pipes to be deformed. To generate the dent pressure, one or more flexible, smooth or profiled pressure rollers can be used, which move in the circumferential direction of the pipe to be dented. The pressure rollers have the same function as the previously described dent profile of the material sheets. However, when profiled pressure rollers are used, the staggered knobs of the dent trough have to be adjusted to the single or multiple helical support elements. The knob shape does not have to be exactly identical to the dent made in the pipe. It suffices when the knobs only reflect the suggestion of the contour of the dent and a sort of nucleation/initial effect during the formation of the dent. This process is also suitable for dent deformation of continuous pipes. As the dent-profiled pipes have an increased radial rigidity and an improved flexibility as opposed to smooth (non-dented) pipes they can be coiled up as continuous pipes.

Alternatively, according to invention, the pipes to be processed can be axially turned and transported so that the rotating pressure rollers can be permanently fixed.

A further favorable design feature of the invention allows for continuous pipes to be dent-profiled. A flexible pressure collar is fixed to the exterior of the pipe and a helix fixed to the inside the pipe. They rotate synchronously with the axial transport speed of the pipe. After the dent deformation has occurred, pressure is released from pressure and collar pulled back, and the helix is moved back to its original position by means of an axial turn. In order to ensure that during this discontinuous dent deformation process uniformly shaped dents occur along the length of the continuous pipes, the invention allows for the denting process to overlap partially so that existing dents act as a nucleus for new dent deformations. Furthermore, a pressure gradient, counter-clockwise to the axial transport direction, is utilized. This pressure gradient is produced in the pressure collar by a compressible medium (e.g. air) or a fluid which flows through porous, flexible materials or plates. Alternatively viscous pastes or gels are used. After the dent deformation process, the pressure is released from pressure collar.

Another invention feature is that a helix can also be used as a support element whose external circumference can be varied through a mechanical or pneumatical device. In this way, the helix can be returned to its original starting position with minimal force after every dent deformation.

A choice is given in the invention that material sheets, foil or shell-shaped containers can be dent-profiled in such a way that truncated cones, dent structured semi-finished products or components are produced. Truncated cone products such as buckets, transport boxes (containers) or beakers have the advantage that they can be economically stacked into each other. Truncated cone components should, for rigidity and optical reasons, have the same number of dents in the circumferential direction, regardless of the variable diameters. A feature of the invention is that parameters can be altered, spacing h of the support helix or rings and wall thickness. When hydraulic pressure is applied, the same number of dents are formed in the circumferential direction, despite differing diameters, by varying the spacing between support elements or wall thickness. Alternatively, according to the invention, truncated pressure rollers are used for the dent deformation process. The local pressure for the dent deformation can be altered by means of a variable angular indication between the pressure roller and the roller with the support elements. Flexible or pneumatic smooth or knobbed pressure rollers can be used to produce truncated work material.

According to the invention, any rotationally symmetrical component can also be deformed by using elastic, pneumatic and/or profiled pressure rollers. It is necessary that dent pressure be varied over the length of the work piece by adjusting the pressure rollers so that, despite changed diameters, the same number of dents occur in the peripheral direction.

Another design advantage allows for calotte shell or ellipsoid, thin walls or foil to be dented. Examples here are spherical containers, dome-shaped bottoms for cylindrical containers or ellipsoid shells, which, despite having thin walls, have a high rigidity. In accordance with the invention, either a dense sphere packing or a case shell are used as support elements, which are externally supported by regularly spaced spheres, semi-spheres or other round support elements. The dent structure of the spherical, thin walls or foil to be formed occurs independently either through external excess pressure or internal underpressure, whereby hexagonal and pentagonal dent structures appear.

The dent-profiled thin material sheets or foil possess an increased rigidity when an apex load (applied radially lengthwise along the cylinder) or punctual load (applied radially) is applied. A dent-profiled cylinder made from sheet aluminum is, for example, about 8 times more rigid than a cylinder made from smooth aluminum, thus a 50% saving in weight and material is achieved. This allows for numerous industrial application possibilities for material and weight saving lightweight constructions.

Furthermore, as the dent-profiled foil retains its uniform dent structure despite numerous indentations, the foil can be used for casings and packaging. Dent-profiled thin walls and foil are suitable for encasing heat insulators. For example, glasswool, as the insulating material can be fixed to the indentations in the dent structures, thus there is no need for additional fixtures or holding devices. The encasings for insulating materials are dimensionally rigid, have a good optical appearance and save material. As a result of the dent profiling process, the surface area quality compared to the flat walls is hardly altered. This also applies to the highly reflexive surface of anodized aluminum reflectors.

A feature of the invention is the application of dent-profiled material sheets in light technology applications. A geometrically directed light reflector which creates diffused light is achieved when concave shells with convexed dent structures are used. A concave shell with concaved dent structures produces a directed, point-focal light scatter. Convex shells with convex dent structures produce an almost uniform diffuse light scatter.

Another design enables dent-profiled material sheets to be used as inherently rigid sound reflectors, whose geometric dimensions lie in the region of the sound wavelengths to be reflected. In order to achieve constant acoustic sound distribution in music halls, theaters etc. convex sheets are normally used as sound reflection. Dent-profiled thin walls are very suitable as suspended sonic elements because of their rigidity. In order to achieve a good sound reflection a heavy wall area is normally required. Thin-walled dented shells can be lined with another material in order to increase the material mass.

Dent-profiled walls or shells can also be used to reduce or avoid acoustic reverberation effects by diffusing the sound within the dent structure. Comparatively deep dents are made whereby the geometrical size of the dent more or less corresponds to the acoustic wavelengths of the air. Application areas: loud factory shop floors, transport halls etc., where the noise is diffused and absorbed in noise absorption units.

According to acoustic engineering laws, good loud speakers must have a low mass and high flexural strength. Thin-walled plates and dish cavities with dented profiles conform to these requirements because the ratio between flexural strength and mass is high.

Another acoustic property of dent-profiled pipes or hollow cylinders is that the acoustic fundamental mode is increased when a dent-profiled wall is compared to a smooth wall with otherwise exact geometrical dimensions. The following applications are possible: a loud speaker with a dent-profiled thin wall has a larger geometrical diameter compared to a smooth wall and consequently a larger resonance body when both the dent-profiled and smooth sound bodies are to have the same acoustic fundamental mode. This includes so-called plate oscillators which act as resonators and absorb the sound by means of resilience on a posterior air cushion. On the other hand in technical applications vibration-free pipes, cylinders or hollow tube blanks are required which are not stimulated to oscillation in the lower frequency area. An example is chimneys which, in order to avoid damage, should be rigid but not subject to oscillation by the influence of wind. This danger can be avoided by using dent-profiled pipes, cylinders and hollow bodies as the lower stimulative oscillation frequency is increased compared to that produced by smooth walls. Undesired booming (clanging) is therefore also reduced.

Another design feature provides for dent-profiled material sheets to be used for dimensionally rigid multi-chambered containers, where the internal partition walls are affixed to the outer wall through the peripheral dent fold. In recycling technology multi-chamber reservoirs or containers are used to separate glass, cans, paper etc. When multi-chamber containers are manufactured from dent-profiled walls they offer two advantages. The containers have less weight because of their shape rigidity and the internal partition walls, which are normally cylindrical, are attached to the outer wall by the peripheral dent fold.

A sandwich construction made up of layered dent-profiled walls or shells, which also increases the shape rigidity, is another feature of the invention.

In order to ensure equal distances between the layered dent-profiled walls, the inner and outer walls are alternately profiled with either left- or right and left-handed helixes. The twists of the helical support are either single or multiple during the dent-profiling process. The free-flow cross section between the dent-profiled walls can be enlarged by spacers if needed. They serve as flow channels for heat or material transfer in power engineering or application technology apparatus. The heat or material transfer is improved compared to smooth wall structures when flow is diffused on the dent structures. Because of the extremely smooth surface texture of the dent-profiled walls, the danger of solid matter particle deposits (so-called fouling) is reduced. A simple and weight-saving construction for heating or cooling plates is obtained when two walls are affixed to each other on the dent-profiled side, i.e. through adhesion or soldering. Dent-profiled thin walls which are affixed to smooth thin walls result in a rigid and optically pleasing wall which can be used as exhibition stand walls or in packaging applications. Sandwich constructions made up of perforated or slotted dent-profiled walls, which are fixed together with spacers, are suitable as weight-saving, sound-absorbing components. An example is a car exhaust which simultaneously has axial compensation properties when thermal expansion occurs. Another favorable result of the invention occurs when spiral-shaped coiled dent-profiled walls are slid into one another and separate flow channels for spiral heat exchangers are formed. The installation is identical to the normal construction technology. However, the spiral walls are dent-profiled which, despite having thin walls, have a high rigidity, low mechanical vibration stimulation and improved convective heat transfer properties.

In a similar manner spiral-shaped, coiled dent-profiled walls are suitable for the manufacture of rotating heat exchangers, whereby the regenerative method, e.g. the waste heat of a hot exhaust flow is transformed to cold fresh air flow. Air flows through the gaps in the spiral shaped sheets in an axial direction. Due to the staggered dent structures, a high convective heat transfer results and the pressure loss is comparatively low.

Another advantage of the invention is that dent-profiled sheets, which preferably have a rough surface, can be used for top-blow (spray-painting) shotcrete. Normally expensive fixtures made up of stiffened material are used to reinforce support concrete constructions which are shotcreted. Dent-profiled walls and shells are better suited for spray painting shotcrete because they are rigid and labour-saving. To ensure that the shotcrete fully adheres to the dent-profiled walls good bonding properties must be obtained. For example, a rough surface of mesh or wire grating is attached to smooth walls. Before the dent-profiling takes place the mesh or wire grating should ideally be affixed to the walls, either by adhesion or soldering.

Composite structuring is another design feature resulting from the invention. When the cavity space in a dent-profiled sandwich construction is filled with a secondary material, dimensionally stable and rigid composite structures are the result. With cylindrical or shell-shaped composite structures the undercut folds of the dent structures provide a good positive locking effect between the dent-profiled walls and the secondary (filling) material. The adhesion properties between the dent-profiled wall and filling material can be improved when a dent-profiled wall is reinforced with mesh or wire grating. Inferior recycled synthetics are suitable as filling materials. This material can either be compressed into the hollow space in a fluid form or in a fluid/solid mixture. For example, heated plastic is spread over the individual dent-profiled walls before being compressed into a composite structure. The fillers are pressed into the cavities of the dented slit, preferably with an agitated nozzle. Alternatively a fluid/solid mixture,(i.e plastic solid mixture) is applied to the individual dent-profiled walls prior to being compressed to a composite structure. These composite structures, when enclosing non-rigid plastic, also have an acoustic absorption quality because expansion and compression occurs during bending vibrations, so that the oscillation energy of the plastic is converted into thermal energy. When dentprofiled composite structures are axial loaded, axial folds buckle and the composite structures are further compressed. This results in the dent-profiled walls having a large absorbing deformation resistance. This is the reason why dent-profiled pipes, spirals or sandwich packets are suitable as spacers, shock and energy absorbers. The cavities between the dent-profiled walls can also be partly or completely filled with energy absorbing material.

Yet another advantage of the invention is the coating of the dent-profiled fold or dent groove. For use in the optical or light technology areas of advertising, interior design etc. the honeycomb shaped dent profiles can be highlighted for lighting purposes by manufacturing dent-profiled transparent thin walls which are covered with a light reflecting layer on one side. The light reflecting layer on the apex of the dent fold or bottom of the groove can be removed, e.g. through etching. This causes the dent-profiled walls in the area of the dent fold or groove to become translucent.

One example in the area of advertising is illuminated letters made of dent-profiled pipes. At night time, the light source within the pipe scatters diffusely and shines through the translucent areas. During the day, the illuminated letters reflect the daylight shining on to the exterior of the dent-profiled walls. The honeycomb-shaped dent profiles can be coloured by various methods, i.e. by transmitting coloured particles suspended in a fluid flow so that the coloration of the transparent surface in the fold of the dent is deeper. Consequently very subtle colour gradients can be achieved. This follows from the flowing physical laws of mass transfer. Vacuum metallization is also possible. Coarse colouring is achieved by color rollers which are rolled over the surface projections. A variable coloration can be achieved by using a thermal color which changes color depending on temperature. A varying temperature distribution along the dent profiles is achieved when, for example, an electric current (Joule effect) flows through the dent structure causing variable heat transfer. The heat transfer on the dent profile influences the temperature distribution.

A further application feature occurs in the production of bottles, drink containers etc. The most popular manufacturing processes are either the extrusion method, i.e. for plastics, or blowing, i.e. for glass. Here the material, in its plastic state, is pressed against an external form by means of interior pressure. In order to equip the thin-walled bottles, drink containers etc. with weight and material saving rigid walls, profiled forms are usually given preference. In the hydraulic process, widely known under the name trade Hydroform, metallic hollow bodies, e.g. pipes, are pressed against an exterior form with a comparably high internal pressure and plastically deformed. As an existing alternative process, sheet metal is deformed by pressure between two molds in the mechanical deformation method. The manufacture of the forms required for this process is expensive. The invention allows for the manufacture of dent-profiled forms, which are used in the following applications methods:

1) Dent-profiled walls are lined on their exterior with dimensionally stable materials, i.e. by smoothing out the surface with molten metals, which have a lower melting point than the material used in the dent-profiled walls. To guarantee a good solidification of the filling material, it is advisable (as previously mentioned) to roughen the surface area. When metal is poured in, heat expansion and therefore deformation of the dent structure can occur. A better method is the sandwich construction made up of dent-profiled walls, as the dent structures support each other.

2) Dent-profiled sheet metal or foil can be used for the manufacture of sand core used in casting practice. The cores with the described dent profile are used to cast the dent-profiled forms.

3) In a similar method to that of the dent-profiled walls being spray-painted with shotcrete, the dent-profiled forms can be spray-painted with metal, which solidifies on the dent-profiled wall. The solidification heat, i.e. the negative fusion heat is dissipated by cooling the forms.

4) When dent-profiled forms are required for extremely high pressure applications in the blow-molding process, the rigid forms can be milled out of high tensile metal. Dent-profiled models are electronically scanned and used as the model for computer-controlled milling.

Further advantageous design features as a result of the invention are described below. Various embodiments of the invention are described in the attached drawings and described in more detail.

DETAILED DESCRIPTION OF THE INVENTION

Figure 1:
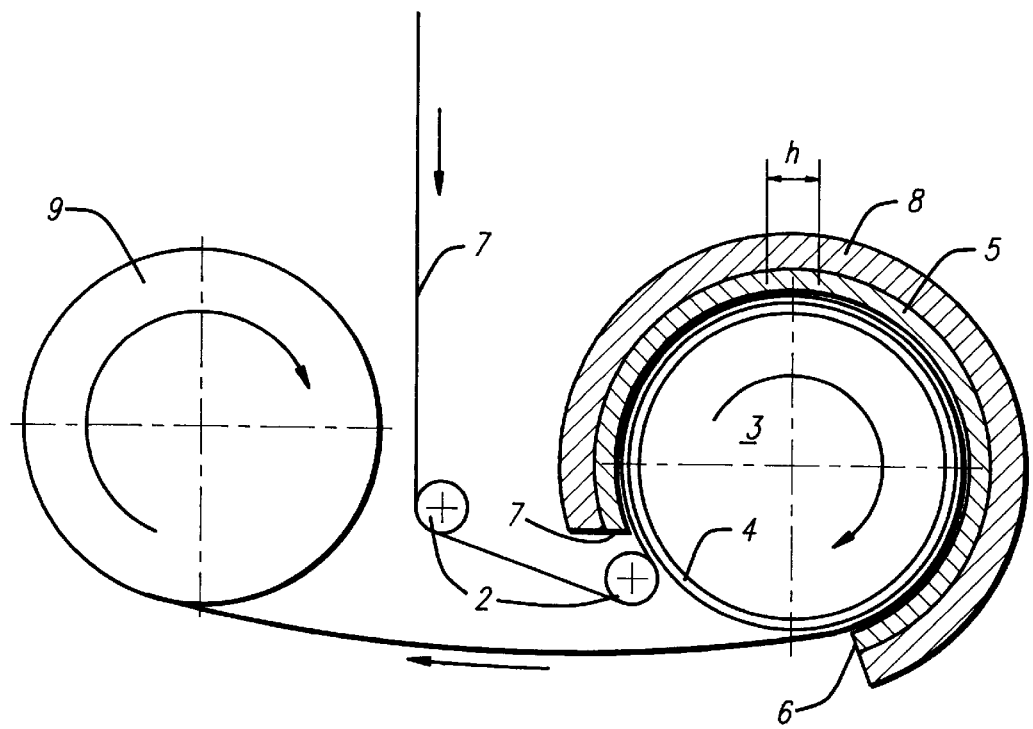
FIG. 1 is a diagram of the invention.

FIG. 1 schematically depicts the semi-continuous dent-profiling process. Sheet 1 is arched over the feed roller 2 and then over the support roller 3, which is equipped with a support helix 4. By means of a flexible pressure collar 5, which is supported by an external holding device 8, excess pressure is hydraulically applied to sheet 1 resulting in a denting process. The dent profile is achieved by the impression caused by the excess pressure on the thin-walled sheet 1. Indentations occur on the thin-walled sheet 1 between the regularly spaced support elements of the support roller 3. Dents first appear along the line of the support elements (helix 4) followed by perpendicular folds that spontaneously form between the first folds. These dent edges or dents folds cause a 3-dimensional dent stiffening. For this reason the local dent remains rigid and the next dent appears. This deformation process happens quickly. The special feature is that the dents along the helical rows spontaneously stagger themselves so that the dent-profiled thin walls receive high rigidity.

After the pressure is released from the pressure collar, the sheet is advanced by turning the support roller 3 so that only a small area of the previously dent-profiled sheet lies under the pressure collar 5. The dent profiling follows on from this dented section. When required, the pressure collar 5 can be built up into different pressure areas between outlet 6 and intake 7. This can be achieved by separate pressure phases on the pressure collar. Alternatively, a pressure delivery pipe is attached to Pos. 5 on the pressure collar so that the pressure, enhanced by an additional drag-in on the pressure collar, is built up from the outlet 6 to the intake 7. This design feature ensures that a uniform dent profile along sheet 1 occurs in the semi-continuous denting process. The dent-profiled sheet is coiled over the roller 9.

When plastic foil is to be dent-profiled, the pressure apparatus is heated up to the elastic/plastic transition region of the plastic. When even higher temperatures for an elastic/plastic dent profiling process are required (deep dents for metal, shallow for glass walls) the pressure collar is replaced by a temperature-stable sealing package.

Figure 2:
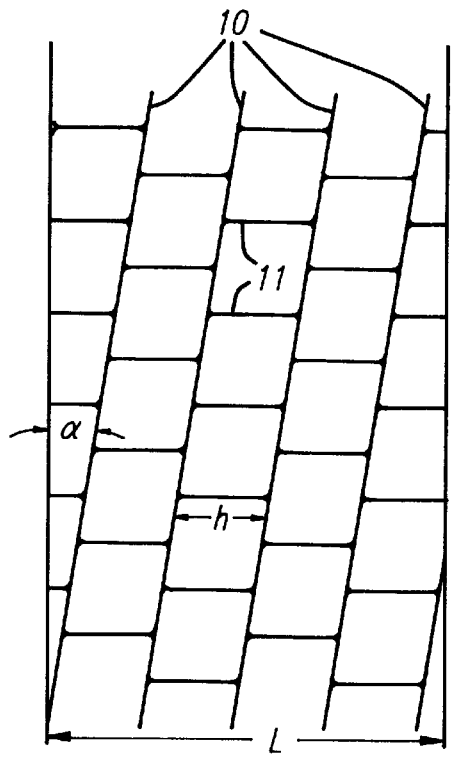
FIG. 2 is a horizontal projection of a dent-profiled structure manufactured on a device according to FIG. 1.
Figure 3:
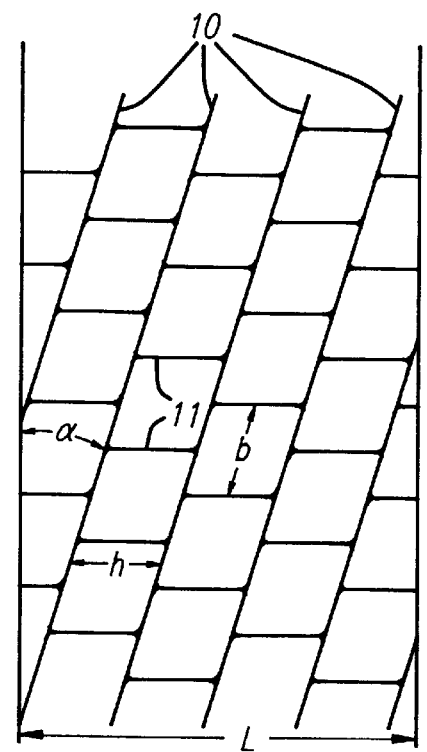
FIG. 3 is a view of an uncoiled dent-profiled structure manufactured on a device according to FIG. 1 used with a multiple helix.

The device depicted in FIG. 1 for the manufacture of dent-profiled rolled sheets can be technically simplified by using rubber covers. The sheet 1 to be dent-profiled and the support helix 4 and the support roller 3 can be hydraulically tightly encased with flexible, bending covers. FIG. 2 shows the dent profile in an uncoiled foil section. The distance h of the dent profiles correspond to the distance h of the support helix 4 in FIG. 1 when a single support helix is used. The revolving dent fold corresponds to the support line of the support helix 4. The axial dent fold 10 and the width b are independently formed during the dent profiling process in FIG. 1. The number of dent structures can be calculated by an empirical evaluation. FIG. 3 shows the uncoiled dent structure resulting from multiple support helices. The angle alpha in FIG. 3 is larger than the angle alpha in FIG. 2.

Figure 4:
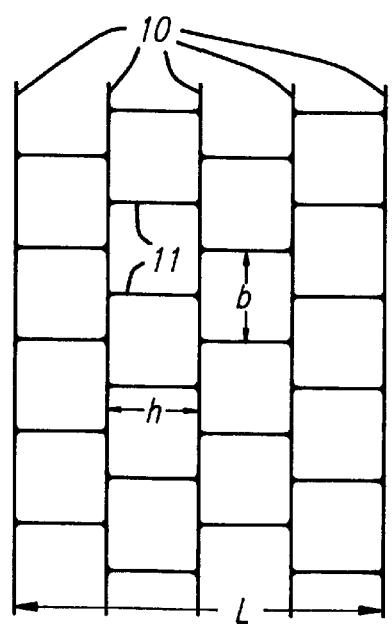
FIG. 4 is a view of an uncoiled dent-profiled structure manufactured on a device according to FIG. 1, using support rings.

FIG. 4 depicts the dent structure in an uncoiled foil produced on a device similar to FIG. 1, where equally spaced support rings instead of a support helix were used. The angle alpha is zero.

Figure 5:
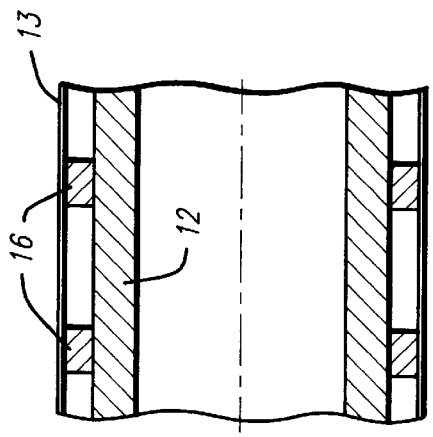
FIGS. 5,6,7,8, and 9 are cross-sections of the different types of flexible support elements on a cylinder jacket.
Figure 6:
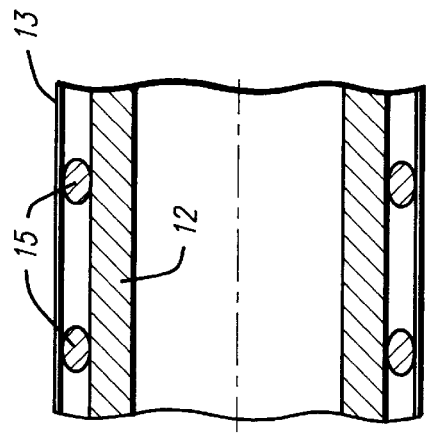
Figure 7:
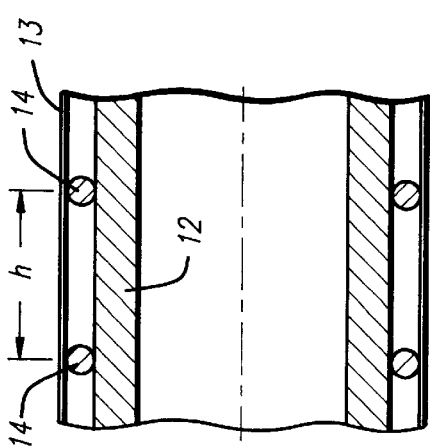
Figure 8:
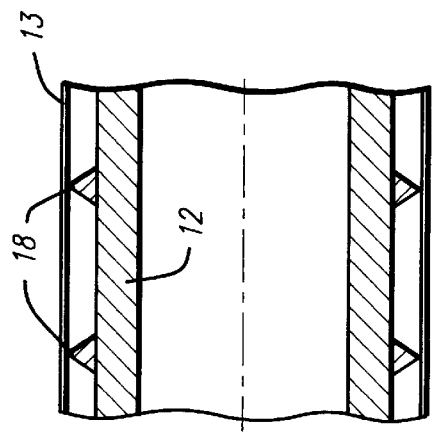
Figure 9:
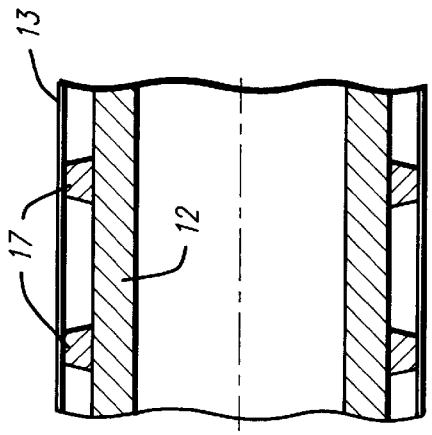

FIGS. 5,6,7,8 and 9 depict the cross-sections of the different types of flexible support elements: FIG. 5 depicts a circular support element 14; FIG. 6 shows an oval support element 15; FIG. 7 depicts a quadrangular support element 16; FIG. 8 illustrates a trapezoidal support element 17; and FIG. 9 shows a triangular support element 18.

Support roller 12 is depicted in the FIGS. 5–9. Element 13 depicts the material to be dent-profiled. Regardless of the type of material used, it is held by support roller 12. In this depiction support elements 14–18 are rings whose cross-sections are circular, oval, quadrangular, trapezoidal, and triangular, respectively. The support elements can also run in a helical course (as opposed to being rings), pneumatically or hydraulically fixed, or in the form of chain links.

When external pressure is applied, which will later be described, dents appear in the material 13. The shape and sequence of the folds which define the borders of the dent will be explained later.

Figure 10:
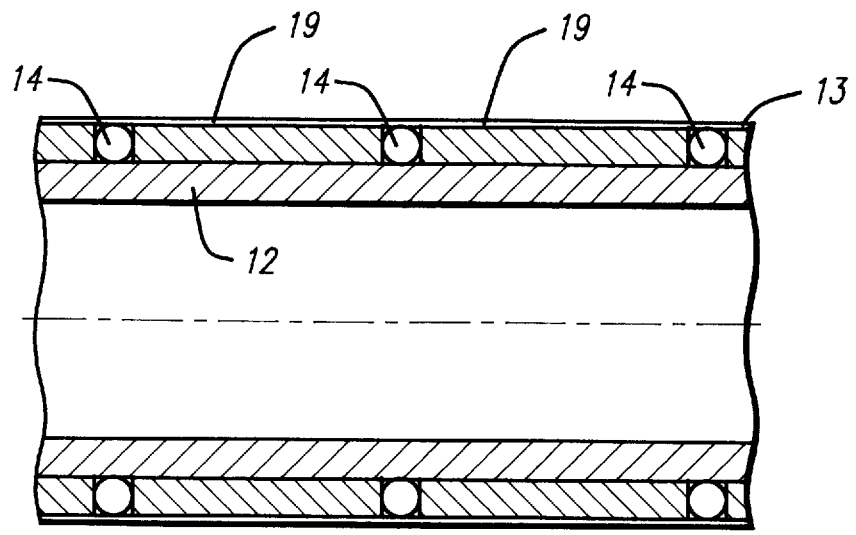
FIG. 10 is a schematic cross-section of a device with elastic/supple packing for the regular spacing of flexible support elements.

Additional spacers guarantee the regular placement of the flexible support elements. The cross-section of the device in FIG. 10 shows the elastic sleeves 19, for the regular spacing of the support element 14 on the support roller 12.

Figure 11:
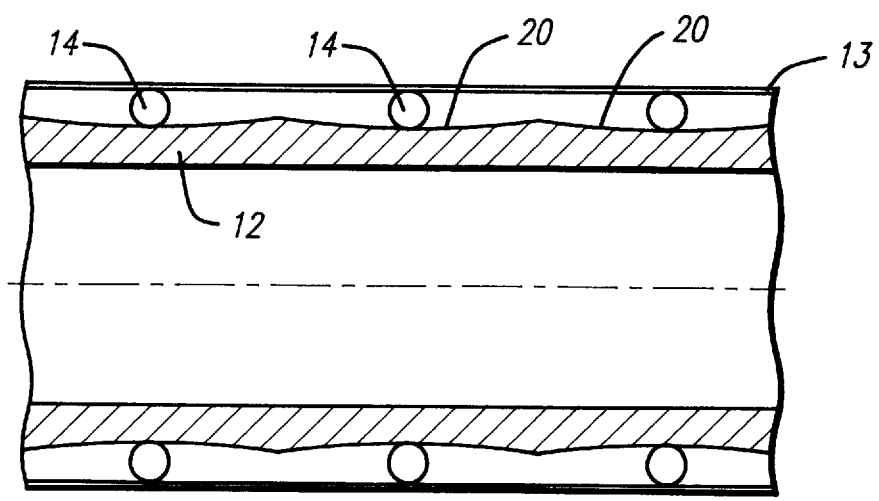
FIG. 11 is a schematic cross-section of a device with grooves in the jacket for the regular spacing of flexible support elements.

The cross-section view in FIG. 11 shows the flat rotating grooves 20, which are also useful for the regular spacing of the support elements 14.

Figure 12:
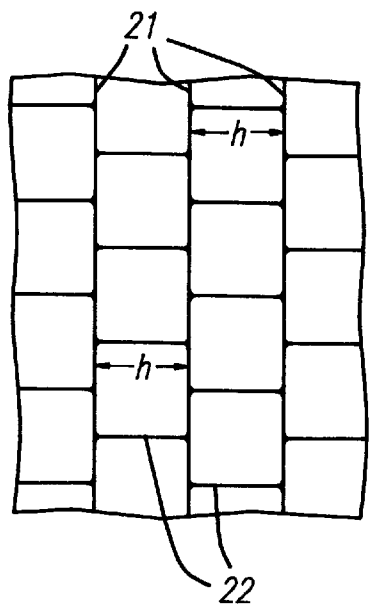
FIG. 12 is a view of a dent-profiled structure manufactured on a device with rigid support elements.

FIG. 12 shows a dent profile of an uncoiled metallic material sheet which has been dent-profiled with fixed support rings. Square or quadrangular dent structures occur, whereby the straight dent folds 21 line up with the course of the stiff support rings. The length of the axial dent fold 22 corresponds to the distance h of the support rings 14 in FIG. 5.

Figure 13:
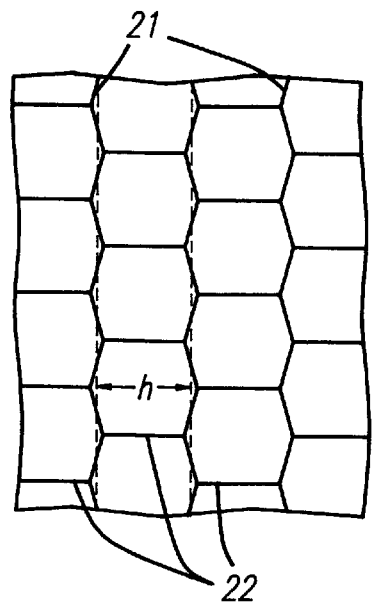
FIG. 13 is a view of a dent-profiled structure manufactured on a device with flexible support elements and low denting pressure.
Figure 14:
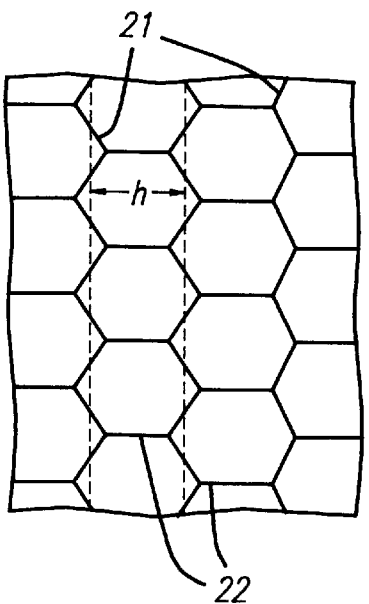
FIG. 14 is a view of a dent-profiled structure manufactured on a device with flexible support elements and high denting pressure.

When flexible support elements are used, hexagonal dent structures appear which are staggered. FIG. 13 shows an uncoiled material sheet which has been dent-profiled with a device with flexible support elements and low pressure. The length of the axial dent fold 22 is slightly reduced compared to the distance h of the support element (prior to dent profiling). The dent fold 21 takes on a zigzag course. FIG. 14 shows that by increasing the denting pressure the length of the dent fold 22 is further reduced so that approximately symmetrical, hexagonal shaped dent profiles finally occur.

Figure 15:
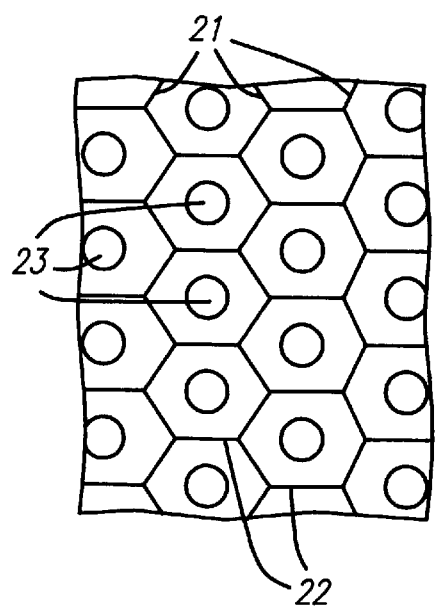
FIG. 15 is a view of a dent-profiled structure manufactured on a device with flexible support elements and leaning on the jacket.

FIG. 15 shows an uncoiled material sheet which has been dent-profiled with a device according to FIG. 5 with thin support elements having a small circular section, whereby the dent troughs 23 in the material sheet press on the support roller and flatten in the middle. These flattened dent troughs have the advantage that the material sheets can be sandwiched on top of each other and easily compounded. Furthermore, dent-profiled material with flattened troughs has a good visual appearance.

Figure 16:
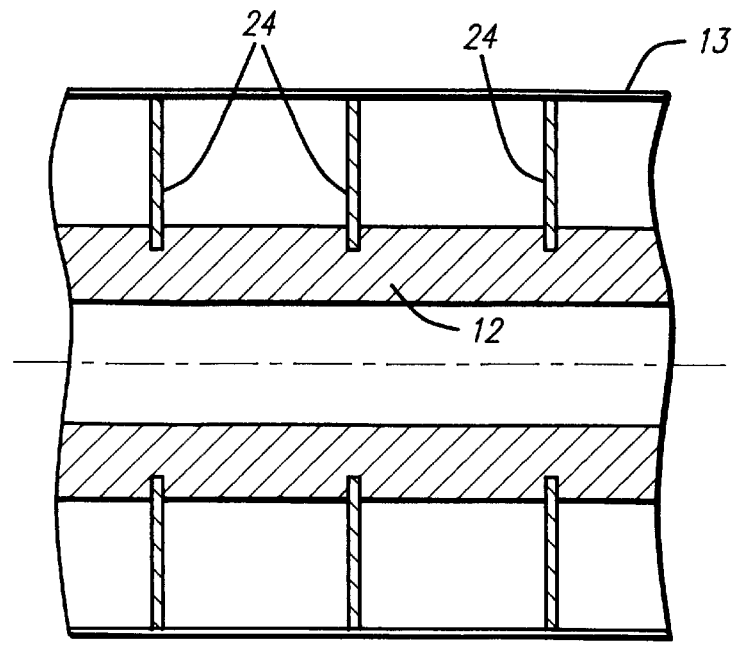
FIG. 16 is a schematic cross-section of a device with regularly spaced flexible support discs on the jacket.
Figure 17:
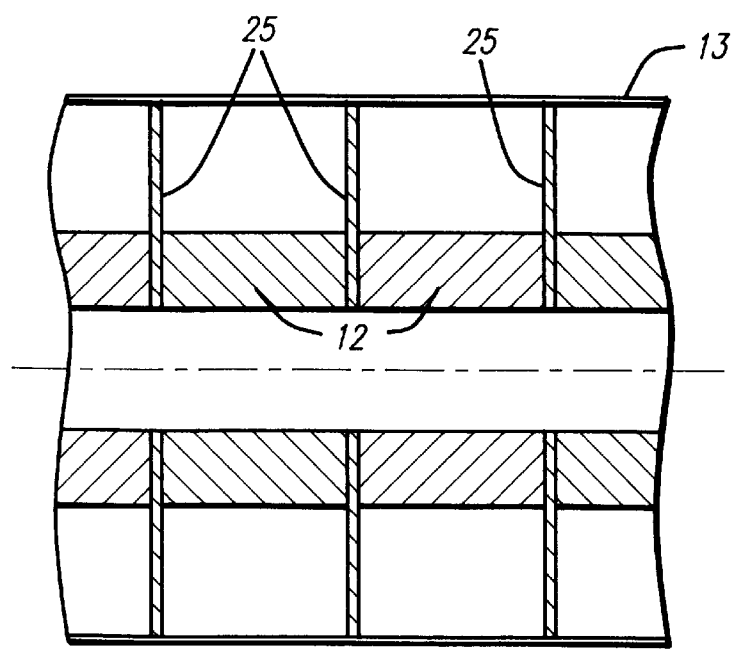
FIG. 17 is a schematic cross-section of another device with regularly spaced flexible support discs on the jacket.

FIG. 16 shows a cross-section of a support roller 12 with permanently fixed flexible support discs 24. The flexible support discs 24 are axially deformed on their circumference during the dent profiling of the material sheet 13 and take a zigzag course in the peripheral direction. Likewise, as shown in FIG. 17, the flexible discs 25, which are regularly spaced on the support roller 12, function as support elements. Depending on the flexibility (or rigidity), the support discs 24 or the discs 25 are axially deformed to a greater (or lesser) extent.

Figure 18:
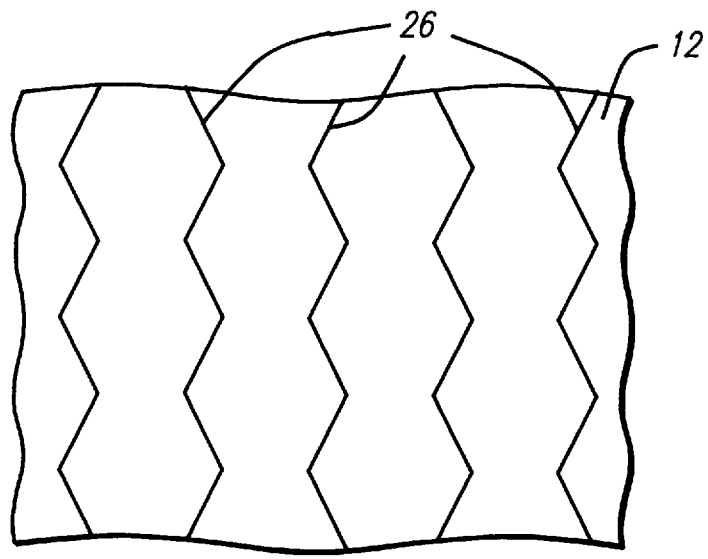
FIG. 18 is a schematic of a device with regularly spaced zigzag shaped support elements on the jacket.

FIG. 18 shows an uncoiled surface of a zigzag shaped support element 26, which is permanently fixed to the support roller 12. These support elements 26 can be made from metallic round or square-shaped profiles, coiled into a zigzag shape and then affixed to the jacket 12.

Figure 19:
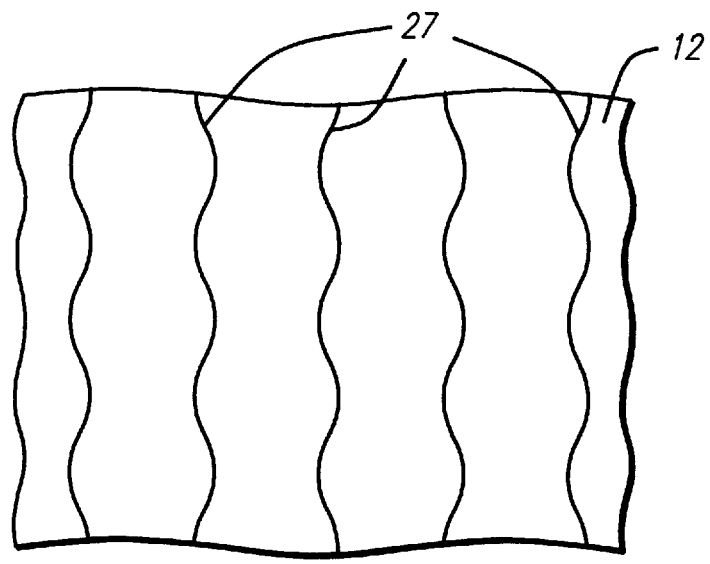
FIG. 19 is a schematic of a device with regularly spaced serpentine shaped support elements on the jacket.

FIG. 19 shows an uncoiled surface of a serpentine support element 27, which is permanently fixed on the support roller 12. Serpentine curves of the support elements are technically easy to construct. The zigzag or serpentine support elements 26 and 27 can also be directly milled into the support roller 12.

Figure 20:
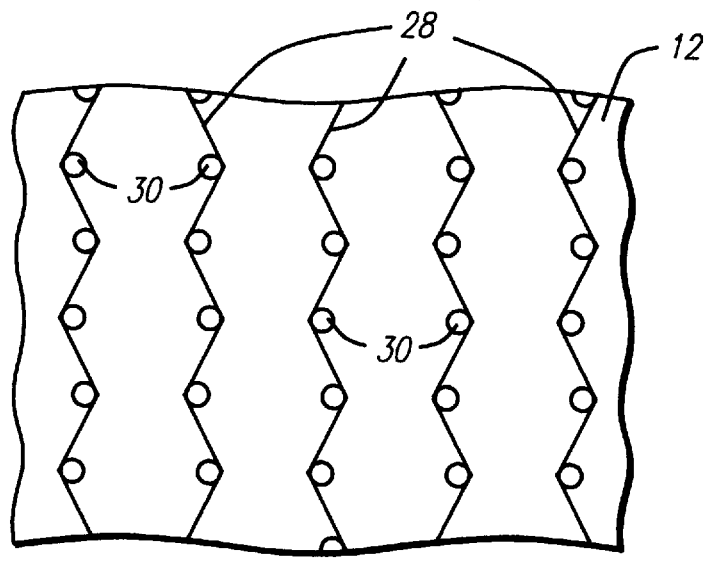
FIG. 20 is a view of a device with coiled and zigzag shaped support elements on the jacket.
Figure 21:
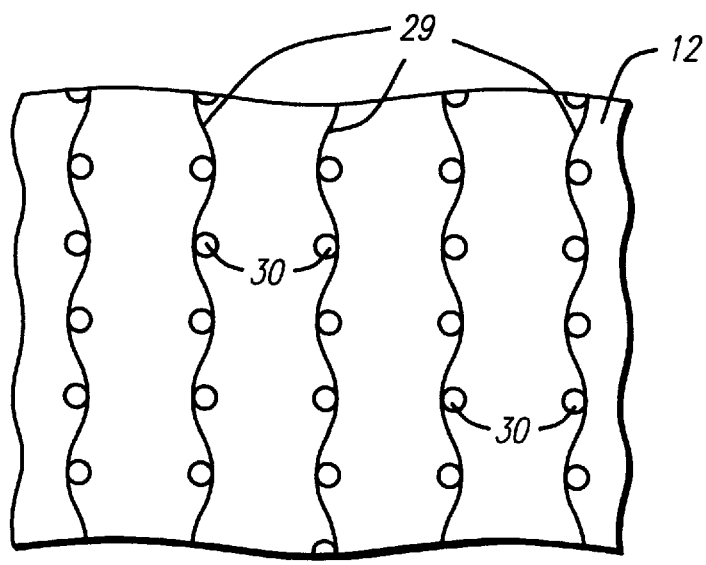
FIG. 21 is a view of a device with coiled and serpentine shaped support elements on the jacket.

FIGS. 20 and 21 show an uncoiled surface zigzag-shaped, flexible support elements 28, serpentine-shaped support elements 29 which are placed on the support pins 30 (on the support roller 12). This placement can either be helical or ring-shaped with rigid or flexible support elements 28 and 29 placed around the pins on support roller 12.

Figure 22:
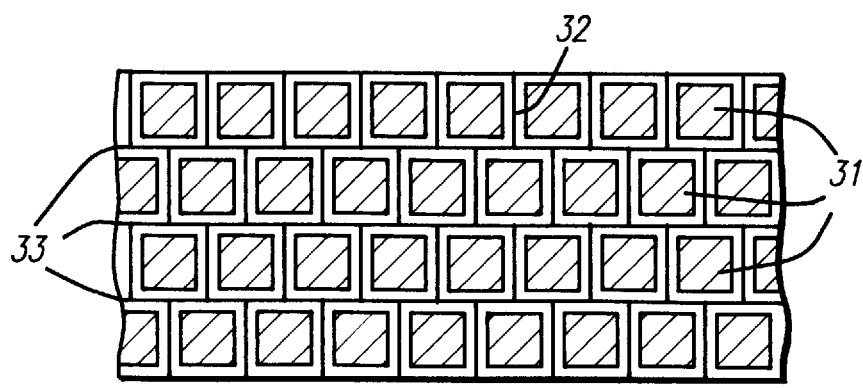
FIG. 22 is a schematic of the knobs and the structure of a dent-profiled band.

Another feature of the invention is that the pressure collar 5 in FIG. 1 has a dent-profiled-like surface which corresponds to the spacing of the support rings 4. The surface of the pressure collar does not necessarily have to be identical to the complete dent shape. It is sufficient that the surface of the dent-profiled-like pressure collar is similar to staggered knobs 31 (shown in FIG. 22) which are made of ebonite. The shape of the knobs correspond to the dents. FIG. 22 schematically depicts an aspect of the knobs 31 and the structure of the dent-profiled sheet 32. The dent folds 33 correspond to the lines of the support rings 4 in FIG. 1.

Figure 23:
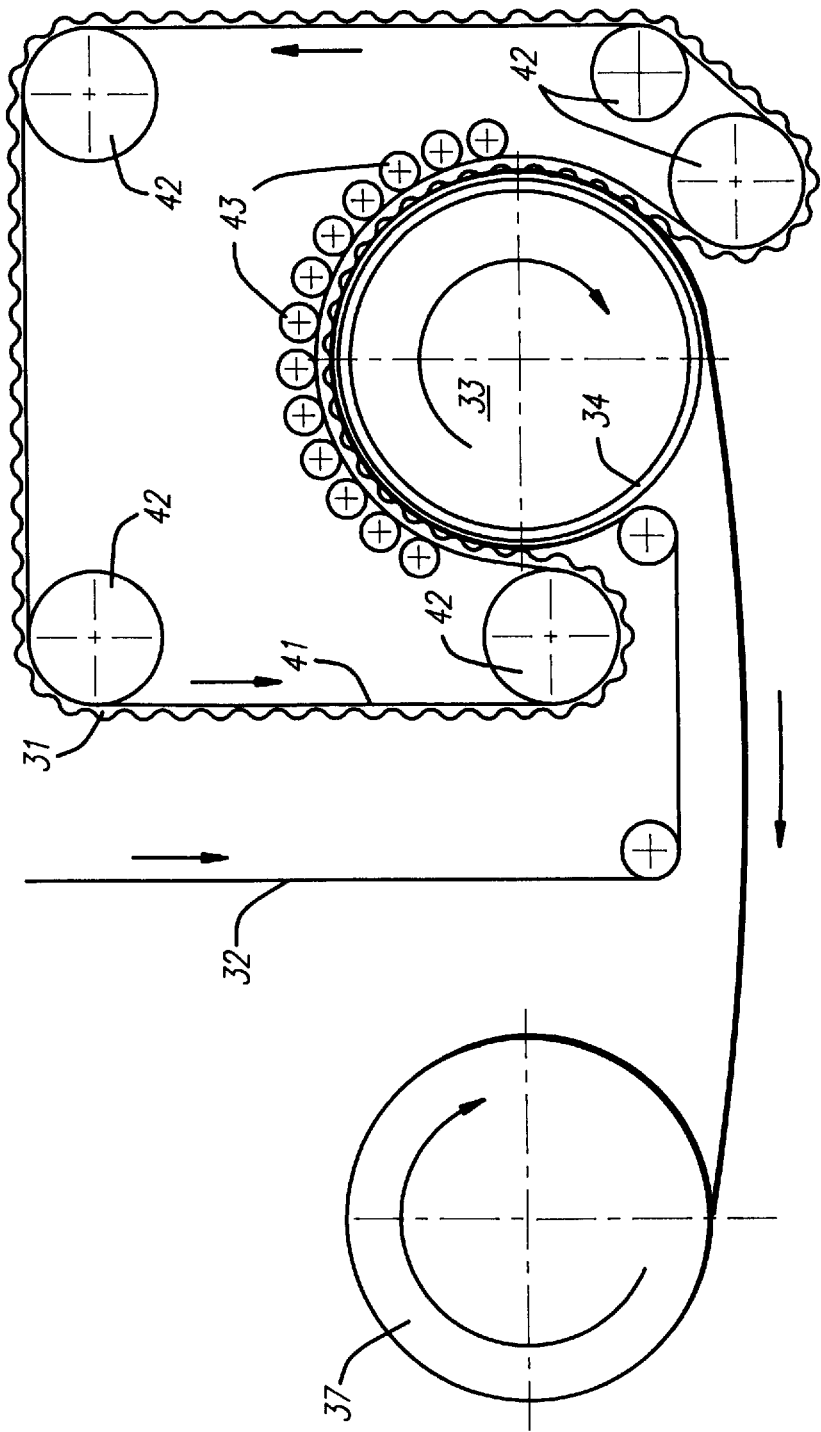
FIG. 23 is a schematic of the design of a device to manufacture dent-profiled material sheets in a continuous denting process.

FIG. 23 schematically depicts the continuous dent-profiling process. Sheet 32 is continuously advanced over the feeding rollers and over the support roller 33 on which the support rings 34 are attached. The rotating profiled band 41 is fed over five guide rollers 42, over the support roller 33, and over band 31. By means of the support rollers 43, the rotating profiled band 41, which is preferably made of fiber-reinforced material, is pressed on sheet 32, so that the dent profiling occurs. The deformation pressure is adjustable by the pressure rollers 43. The dent-profiled band is then coiled up on the roller 37.

Figure 24:
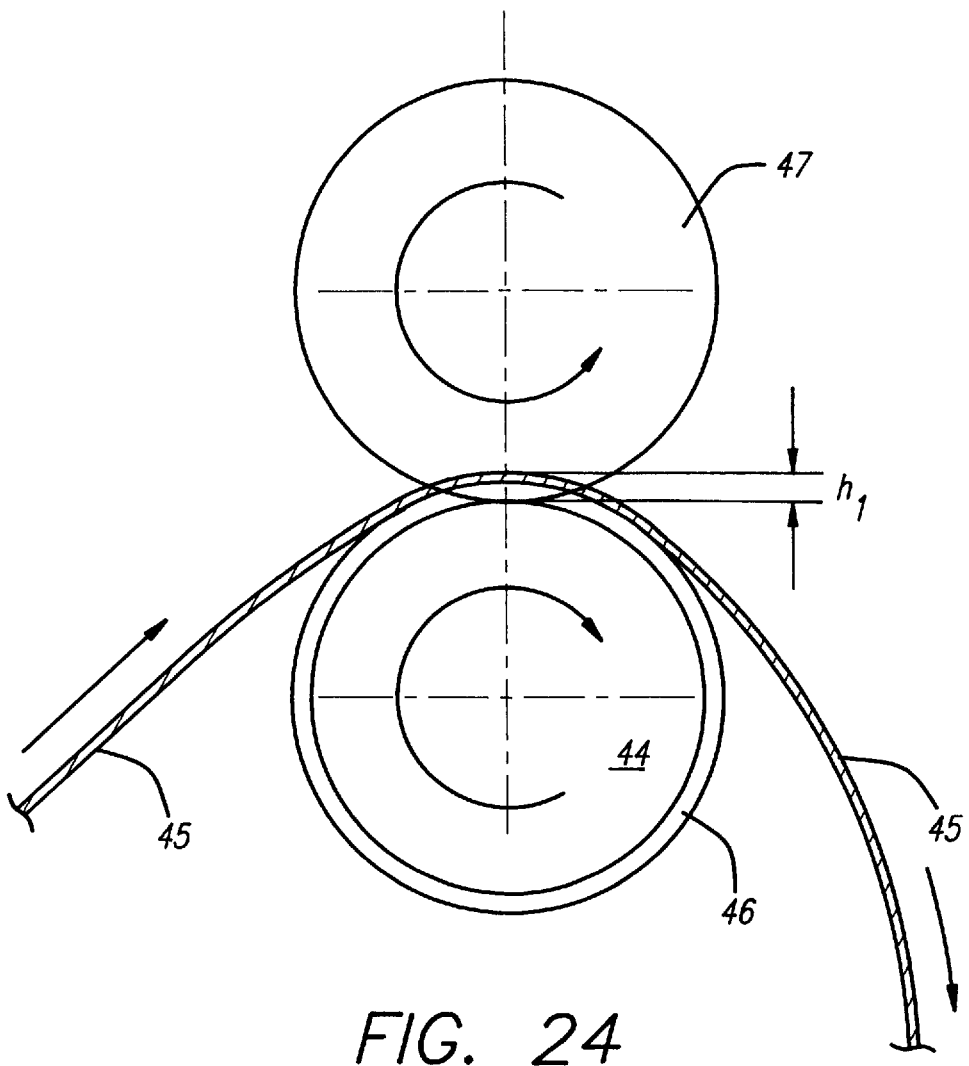
FIG. 24 is a schematic of the structure of a device to manufacture dent-profiled material sheets with a flexible pressure roller and a jacket studded with support elements.

FIG. 24 schematically shows a device with mechanical relaying of the dent pressure. The device is suitable for continuous manufacture of dent-profiled material sheets. The sheet material 45 is curved and transported over the support roller 44 with the support elements 46. A flexible, smooth pressure roller 47 transfers the pressure required for the dent deformation. The elasticity of the pressure roller 47 and its diameter are chosen so that in the contact area of the pressure roller 47, where the material sheet receives the required pressure for the dent process, a segment of approximately 2 dents in the peripheral direction of the material sheet is indented. The view of the segment serves to explain the contact area. When in operation, the support rollers 44, the support elements 46 and the pressure roller 47 produce a continuous line of dents. In the example, the pressure roller 47 is made of rubber. As an option, the contact area can comprise less or more than 2 dents in the peripheral direction.

Figure 25:
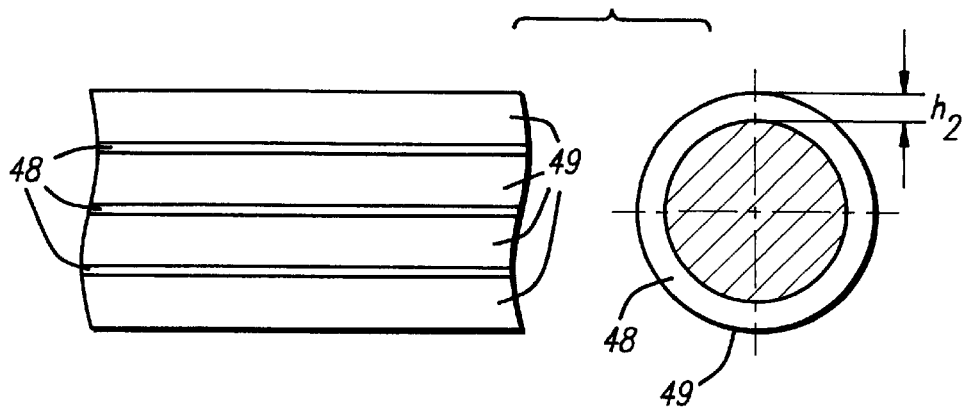
FIG. 25 is a view of a device with regularly spaced axial slits in the flexible pressure roller.
Figure 26:
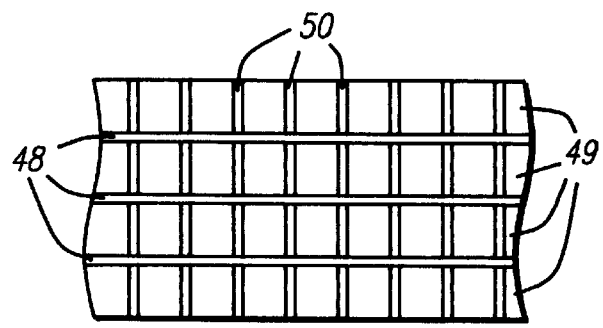
FIG. 26 is a view of a device with regularly spaced axial and radial slits in the flexible pressure roller.
Figure 27:
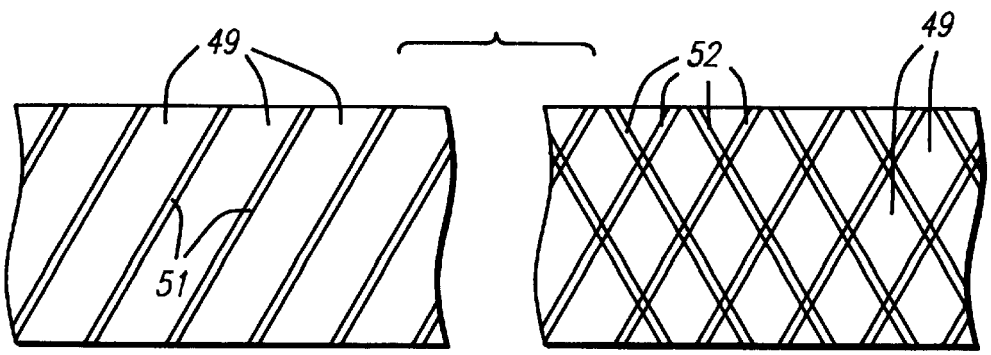
FIG. 27 is a view of a device with regularly spaced helical-shaped slits in the flexible pressure roller.

According to the invention, FIG. 25 depicts an uncoiled, surface of the regularly-spaced axial slits 48 in the flexible pressure roller 47. The slit depth $h_2$, as depicted in the cross-section, is preferably larger than the impression depth $h_2$ of the flexible pressure roller 47 during the dent deformation process as in FIG. 24. Due to the slits 48, the pressure areas formed on the material sheet by the flexible pressure roller 47 appear like independent pressure areas and cause the required overlapping dent pressure between the flexible pressure roller 47 and the material sheet 45 to be formed. Without the slits a straight pressurization (i.e. not a two-dimensional pressure) would occur despite the overlapping of the flexible pressure roller 47 and the material sheet 45. FIG. 26 shows a pressure roller with both axial 48 and radial slits 50. FIG. 27 shows a device with either helical-shaped slits 51 or crossed helical-shaped slits 52 in the flexible pressure jacket 47. All the mentioned slit arrangements serve to produce the best possible even two-dimensional dent pressure.

In a further undepicted example, a flexible pressure roller, made of rubber or another elastomer, is equipped with a dent-profiled-like or knobbed, staggered surface which corresponds to the distances on the support elements 46. The knobs are made from either a flexible or rigid material. The knobs have a shape which is, according to the application example, smaller than the shape of the dent to be deformed. The knobs create an initial effect when the dent occurs. Despite the smaller size of the knobs the dents are fully formed due to the deformation of the rubber on the pressure roller and the pressure in the contact area.

In another undepicted example, a stiff pressure roller is fitted with either a dent-profiled-like or knobbed, staggered surface so that thick-walled material sheets can be dent-profiled. The knobs are profiled in such a way that an indentation occurs but no typical deep-draw deformation characteristics develop.

Figure 28:
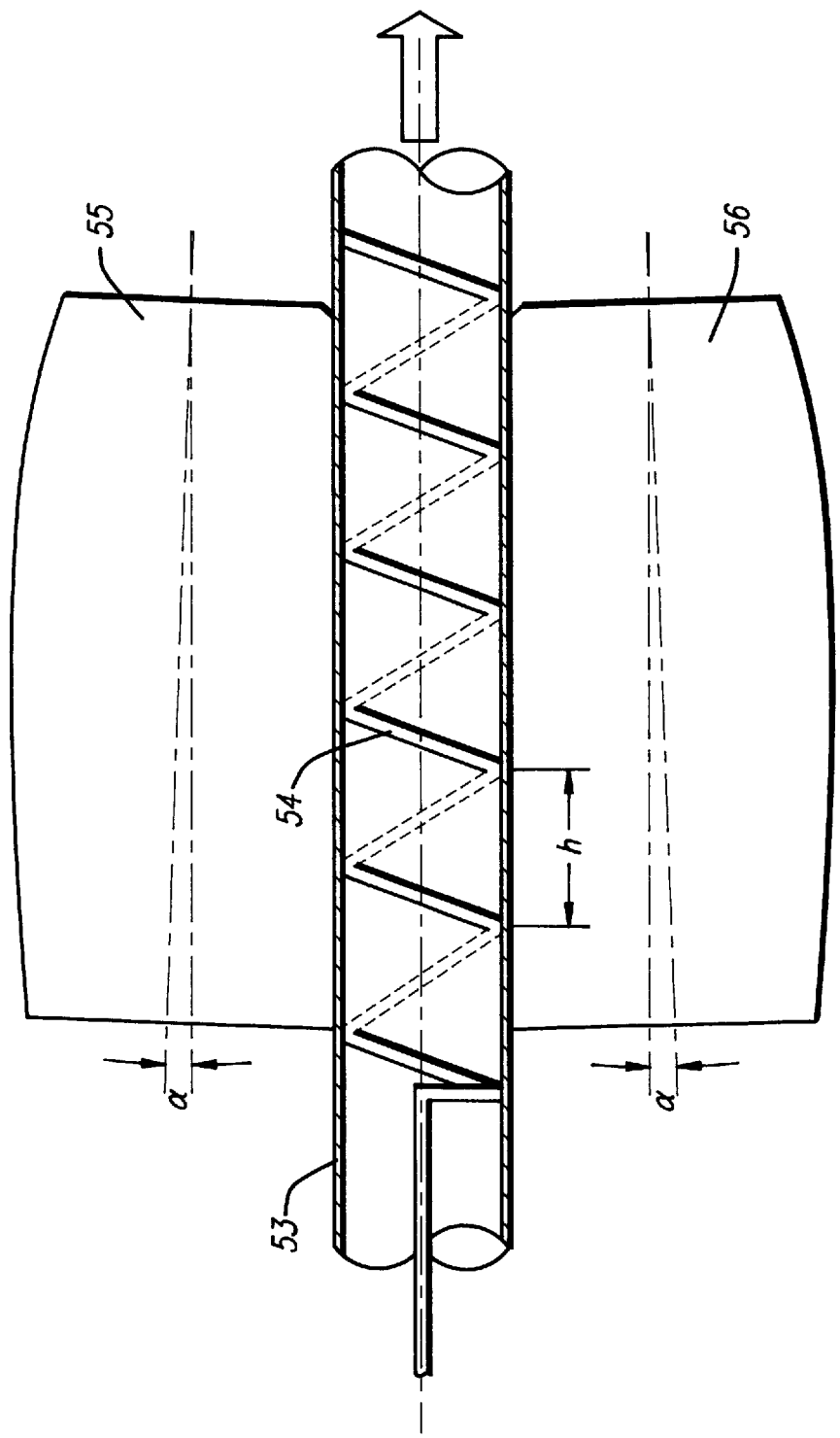
FIG. 28 is a schematic of the design of a device to manufacture dent-profiled pipes with two external pressure rollers and an internal support helix.

The device depicted in FIG. 28 shows a device to manufacture dent-profiled pipes, even long pipes. The pipe to be deformed 53 is axially transported and supported on the inside with a helix 54. The helix 54 has a movement width h and depicts the regularly spaced support elements. Two rotating pressure rollers 55 and 56 like the pressure roller 47, are placed over the pipe to be deformed in a peripheral direction and at the position of the helix 54, and cause the dent-profiling in the pipe. The dent-profiled pipe is transported in an axial direction by the synchronous movement of the helix 54 and the pressure rollers 55 and 56.

Like the pressure roller 47, the pressure rollers 55 and 56 are made of a flexible, smooth material, in this case rubber. The elasticity of the pressure rollers 55 and 56 is selected so that when pressure is put on the pipe, a pressure element is imprinted which corresponding the peripheral two dents in the peripheral direction of the pipe. The pressure rollers 55 and 56 are ideally crowned and placed slightly axial to the angle opposite the pipe to be dent-profiled. In this way the pressure rollers 55 and 56 generate a pressure gradient towards the transport direction of the pipe, so that a continuous dent-profiling process in the axial direction of the pipe occurs.

In order for both pressure rollers 55 and 56 to produce a flattened dent pressure on the pipe to be deformed (pipe 53), the invention allows for flexible pressure rollers with slits to be used. Preference is given to helical-shaped slits and also crossed helical-shaped slits which correspond to the helical dent profiling of the pipe.

In accordance with the invention, both pressure rollers can be used—also together with additional pressure rollers—to achieve a phased deformation. For instance, one pressure roller can be equipped with knobs, thus initiating the dent profiling process and the other without knobs, which finishes off the deformation. All these processes can be combined with a multiple helix.

In another application example according to FIG. 28, the pipe 53 to be dent-profiled is turned in an axial direction and transported further. The synchronously rotating pressure rollers 55 and 56 are permanently installed. The helix 54 is also permanently installed. This process is suitable for the discontinuous dent profiling of individual pipes. In the example in FIG. 28, the pressure rollers are driven. They run over the pipe. Instead of this or in conjunction with the pressure rollers, the pipe can be driven.

Figure 29:
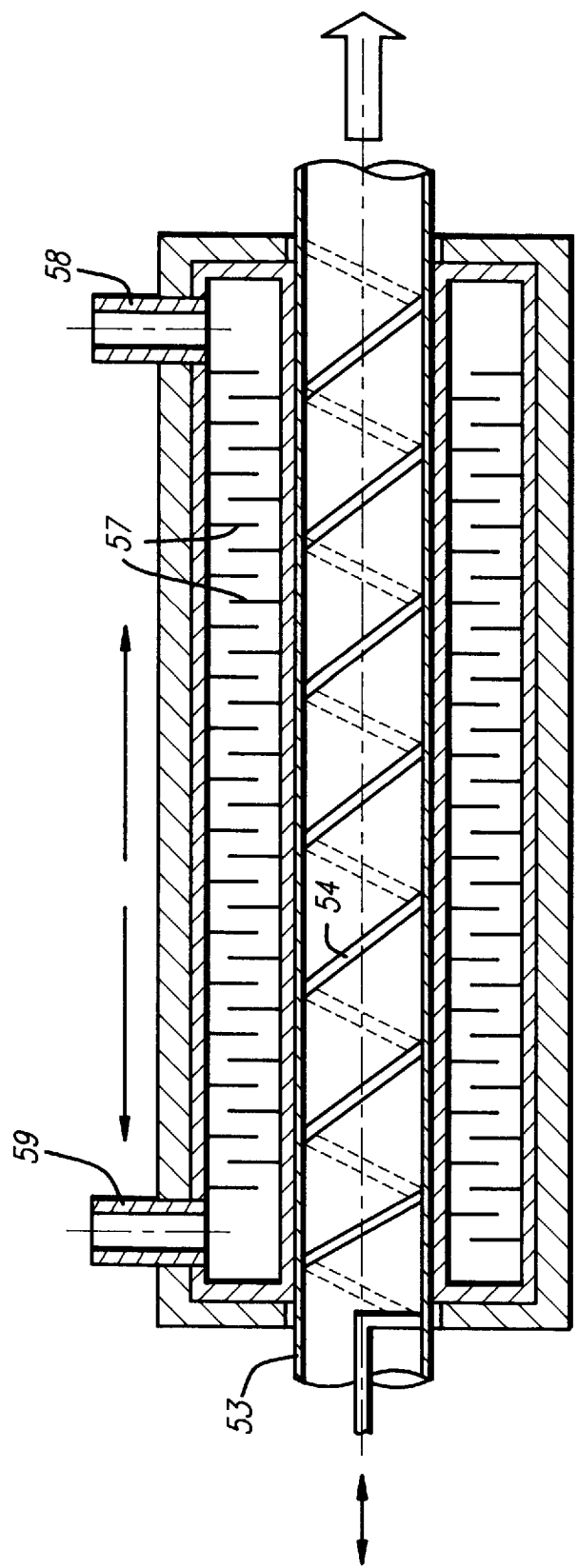
FIG. 29 is a schematic of the design of a device to manufacture dent-profiled pipes with an external pressure collar and internal support helix.

The device depicted in FIG. 29 shows the design of an additional device used to dent-profile long pipes. The pipe to be deformed 53 is supported on the inside with a helix 54 and enclosed on the outside with a cylindrical pressure collar 57. While the pipe progresses along at a continuous axial speed, the pressure collar 57 and the helix 54 are simultaneously moved part of the distance. During this operation the pressure in the pressure collar 57 is built-up, counter-clockwise to the transport direction, by means of a compressible medium (e.g. compressed air or a fluid), which flows into the pressure collar 57. The friction losses, caused by the current linkage on the lamella, result in a pressure gradient. After the pipe walls have been dent-profiled the pressure collar 57 is relieved of pressure and moved back to its original position. At the same time the helix 54 is also returned to its original position. This process repeats itself as previously described.

The pressure gradient in the pressure collar 57 is only generated for a short time at the beginning of the dent-profiling process so that dents develop in the allowed time. At the end of every denting process the pressure collar 57 has a constant denting pressure so that the indentations are identical. In order to control this process the pressure collar has several pressure ports 59. When required, the pressure collar 57 can be separated into several sections.

In order to reduce friction losses between the internal pipe wall and the helix 54 during the reversing process, the diameter of the helix 54 is slightly reduced, preferably by means of a mechanical deformation on the helix 54. Alternatively, a pneumatical helix can be used. Optionally, the helix and the mechanical or pneumatical or hydraulic devices can be designed so that the diameter can be varied. The axial movement is thereby simplified. The helix can also be formed by a coiled band.

Figure 30:
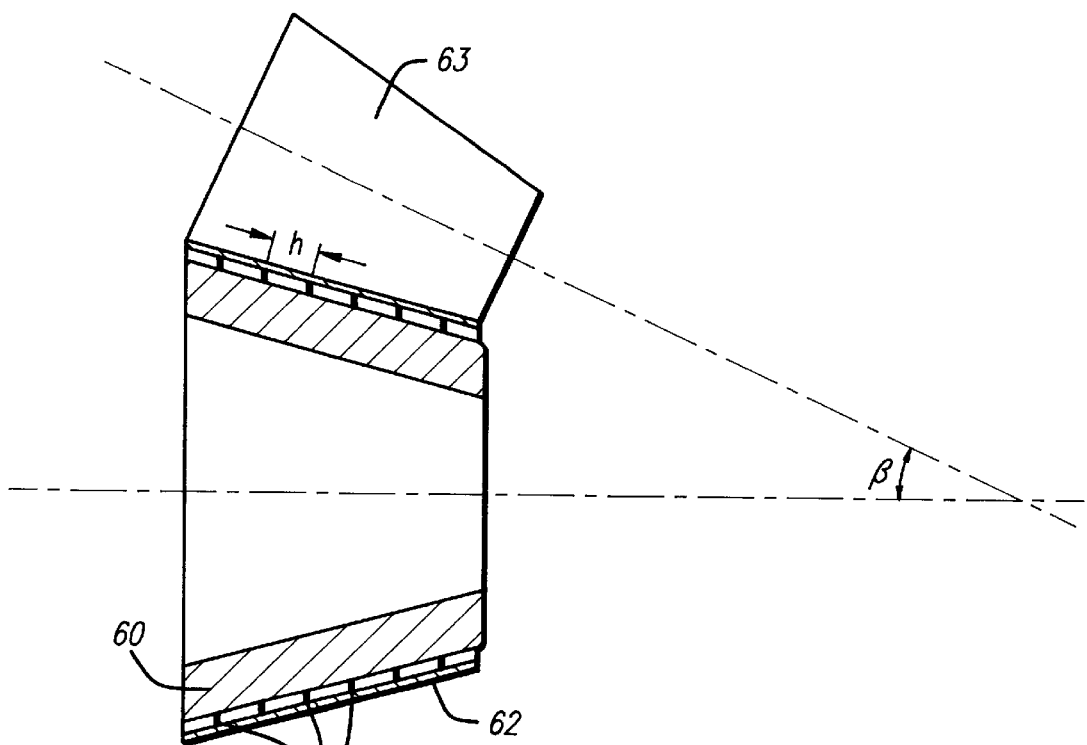
FIG. 30 is a schematic of the design of a device to manufacture cone-shaped, dent-profiled components with two cone-shaped rollers.

FIG. 30 shows the design for manufacturing conical-shaped, dent-profiled components. The support rings 61 on the conic support roller 60 are regularly spaced in such a way that the distances between the support rings 61 become larger with the increased diameter of the truncated cone. This is on purpose so that the constant wall thickness of the conic material to be dent-profiled 62 has a constant number of peripheral dents, despite the variable diameter of the truncated cone. At the same time the dent pressure in the area of the larger diameter is lower than in the area of the smaller diameter. The invention allows for variable dent pressure adjustment in that the conic elastic pressure roller 63, as opposed to the conic support roller 60, is equipped with a variable angle, inclined and impressed. In accordance with the invention and for reasons previously described, the elastic pressure roller 63 should preferably be equipped with straight course axial or helical-shaped slits. Like the other pressure roller 47, the pressure roller 63 can have a dent-profiled-like or a staggered knobbed surface. As the surface profile of the pressure roller is pre-traced, the distances h on the support rings do not have to be exactly adhered to as is the case with an elastic, smooth surface without knobs. According to the invention the choice of the wall thickness of the conic component 62 is made so that with increased conic diameter the dent profiling can occur with uniform pressure.

Figure 31:
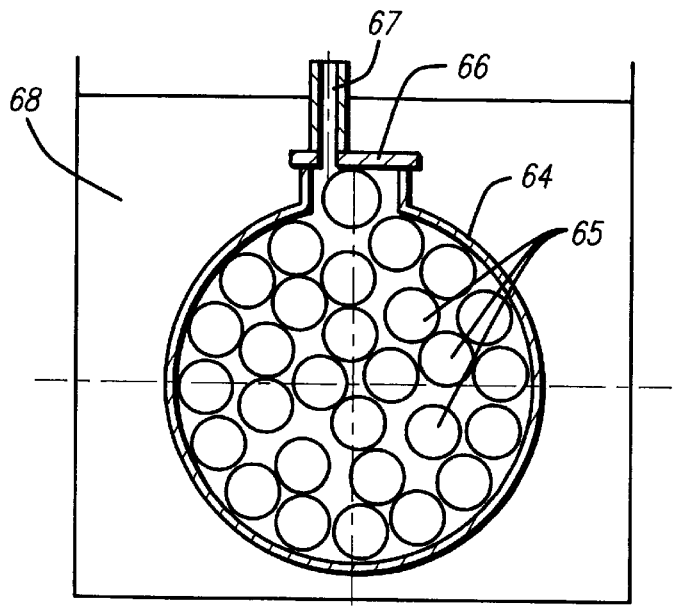
FIG. 31 is a schematic of the design of a device to manufacture spherical, dent-profiled components.

FIG. 31 depicts a device to manufacture spherical dent-profiled components 64. Spheres 65 are packed into the opening 66 so that a tight sphere packing is achieved. The spheres function as regularly spaced, punctual support elements for the dent profiling of the spherical-shaped component 64. The dent pressure, preferably on thin plastic walls, is achieved by internal underpressure (vacuum locking 67) and/or by means of external excess pressure (submersion in a liquid 68) and then imprinted on the wall to be profiled. Normally hexagonal and pentagonal dent profiles appear on the spherical-shaped wall. Once the dent profiling process has finished the spheres 65 can be removed through the opening 66.

Figure 32:
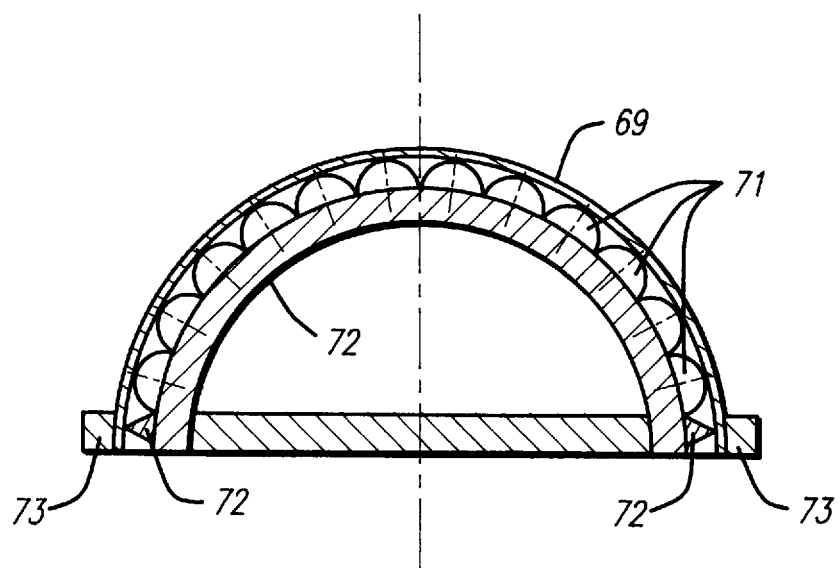
FIG. 32 is a schematic of a device to manufacture calotte shell-shaped, dent-profiled components.
Figure 33:
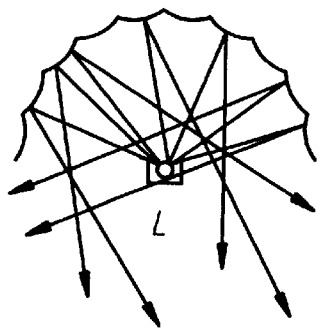
FIGS. 33,34,35, and 36 are schematics of a device to manufacture different shell-shaped, dent-profiled components for diffuse light scatter.
Figure 34:
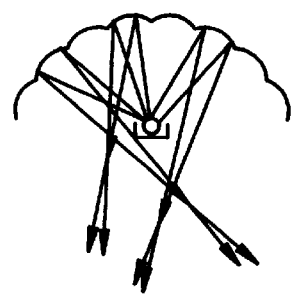
Figure 35:
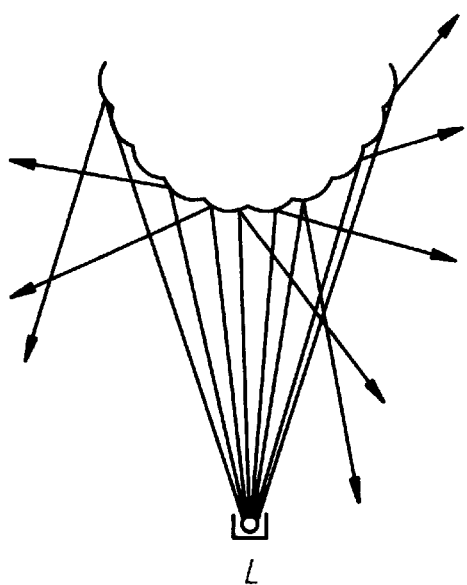
Figure 36:
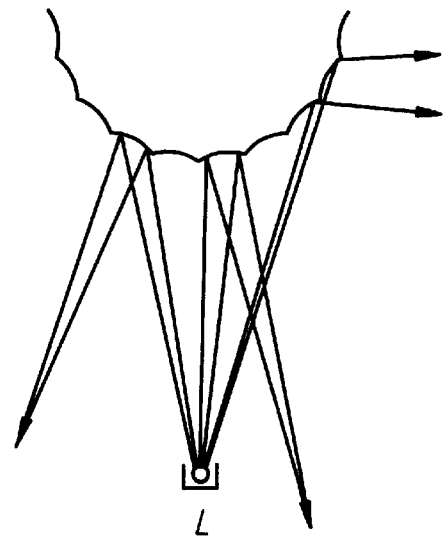

FIG. 32 depicts a device to manufacture calotte shell-shaped, dent-profiled components 69. The support elements in this process are regularly spaced support elements, preferably small spheres or hemispheres 71, which are attached to a spherical support element 70. By means of an elastic toroidal ring 72 and an external straining ring 73 the calotte shells 69 to be dent-profiled and the spherical support element 70 are tightly bonded to each other. Dent pressure is applied by internal underpressure and/or external excess pressure analog to FIG. 31. According to the invention, shell-shaped and/or rotationally symmetric dent-profiled components, preferably spherical cap bottoms or ellipsoid hollow bodies or shells can be manufactured, analogous to FIGS. 31 and 32. These components have a high rigidity and low specific gravity.

Some of the advantages of the present invention is discussed herein, and in conjunction with FIGS. 33–40 where appropriate. According to the invention cylindrical, conical and shell-shaped dent-profiled components can also be assembled. In special cases, cylindrical, conical and shell-shaped thin-walled (including the support elements) can be bonded and then simultaneously dent-profiled by means of internal underpressure and/or external excess pressure. In this way, complicated and multi-dimensional components with high rigidity and low specific gravity can be manufactured. Application examples are rigid, lightweight constructions in transport, aviation and medicine technology. In sandwich constructions the dent-structured surface allows for an improved bonding of the secondary materials.

The devices depicted in FIGS. 33–36 schematically show the different types of shell and dent structures for light reflection purposes (L=light source): A concave shell with convex dent structures produces a geometrically directed light reflection with diffused light dispersion. A concave shell with concave dent structures produces an almost all over diffused light dispersion. A convex shell with concave dent structures produces an almost all over punctual light dispersion.

Figure 37:
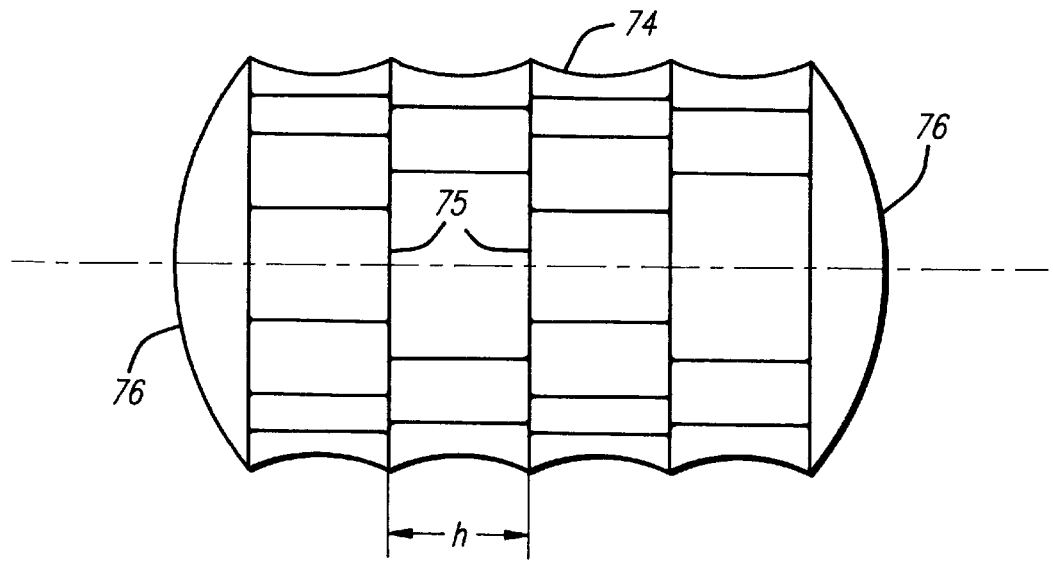
FIG. 37 is a schematic cross-section of a multi-chamber container.

FIG. 37 shows a cylindrical multi-chambered container. The dent-profiled cylindrical wall 74 has a distance h in the revolving dent fold 75 (10 in FIG. 4), whereby h corresponds to the distance of the dividing walls to each other. The dividing walls are affixed to the revolving dent fold 75 on the wall which, when required, can also be glued together. The calotte shells 76 laterally occlude the multi-chambered containers, thus providing rigid, weight-saving multi-chambered containers which, in the case of waste disposal bins, also have intake openings and lockable drain openings. These functions are not shown in FIG. 37.

Figure 38:
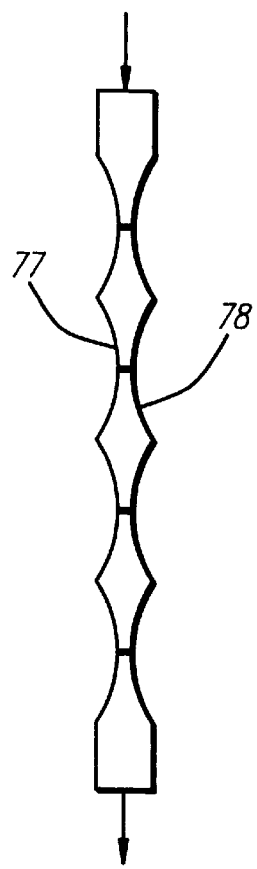
FIG. 38 is a schematic cross-section of a heating/cooling plate.

FIG. 38 shows a heating or cooling plate. Two dent-profiled plates 77 and 78 are pressed together with dent-profiled sides facing each other and then glued or soldered. The heating or cooling medium flows through the gaps.

Figure 39:
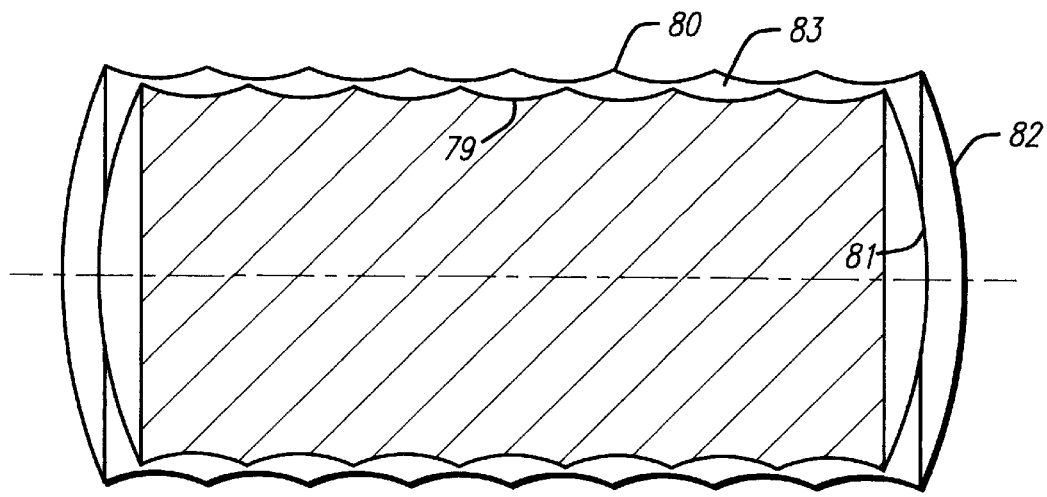
FIG. 39 is a schematic of a double-walled cylinder manufactured from dent-profiled sheet material on a device depicted in FIG. 1.

FIG. 39 shows a design for a double-walled cylindrical container, i.e. for storing hazardous liquids. The interior wall 79 comprises a dent-profiled cylinder onto which the externally dent-profiled cylinder 80 is coiled or wrapped. In order for the dent-profiled walls 79 and 80 to support each other dent structures are used which ideally have a varying twist and varying angles (FIGS. 2,3 and 4). The calotte shells 81 and 82 are glued or welded to the dent cylinders 79 and 80. The ring annulus 83 serves as a receptacle for testing fluids or heating or cooling mediums. Openings for intake, draining or monitoring probes are not depicted in FIG. 39.

Figure 40:
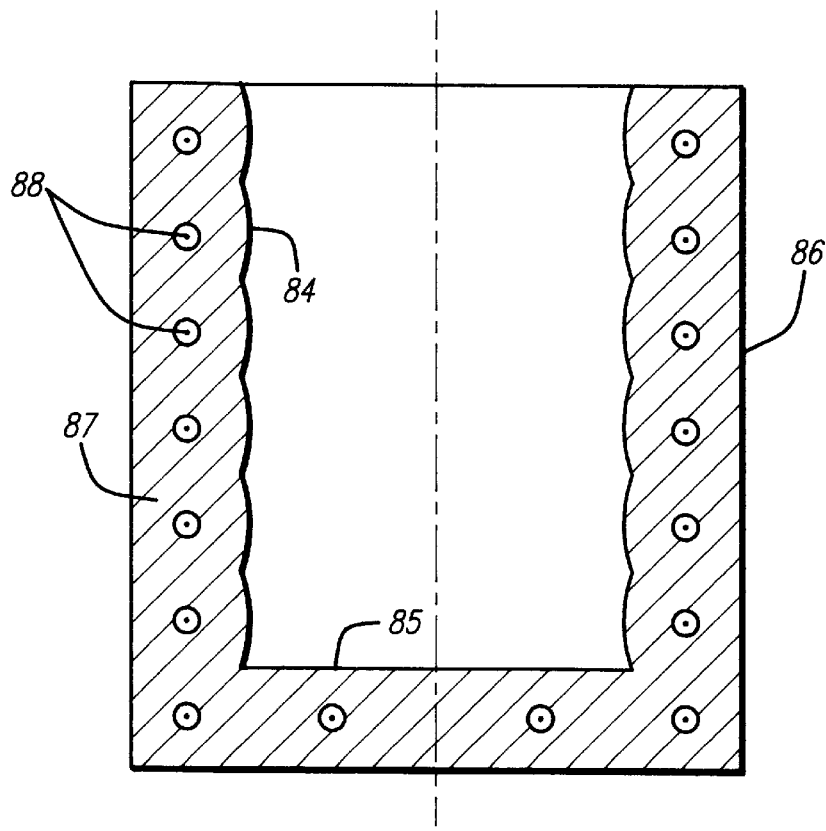
FIG. 40 is a cross-section of the principle construction of a form with a dent-profiled surface for the manufacture of containers according to extrusion blowing technology.

FIG. 40 shows the principle design of a form with a dent-profiled surface for the manufacture of vessels according to the extrusion process. A dent-profiled cylindrical wall 84, with a bottom 85, is placed in a cylindrical container 86 with a low-boiling fluid medium 87 in the annulus, which contains the condensing coil 88. In order to achieve a better adhesion of the solidified molten bath (metal) onto the dent-profiled wall, the external surface has been roughened. The condensing coil 88 serves to cool the form during the thermic blowing process.

Although the present invention has been described with reference to specific embodiments, it is appreciated by those skilled in the art that changes in various details may be made without departing from the invention defined in the appended claims.

Thus, a method and apparatus for dent profiling has been described.

I claim:

1. A method for producing a dent profiled material sheet, the method comprising the steps of:
   curving a material sheet;
   supporting said material sheet by means of spaced-apart support elements;
   applying pressure to said material sheet by pressure collar means, thereby producing said dent profiled material sheet having a plurality of dents, each of said plurality of dents having resultant edges; and
   lowering said pressure sufficiently to advance said dent profiled material sheet.

2. The method of claim 1 wherein said material sheet has a plurality of segments, and wherein said steps are applied to said segments successively.

3. The method of claim 1 wherein said step of applying pressure produces quadrangular dents.

4. The method of claim 1 wherein said step of applying pressure produces pentagonal dents.

5. The method of claim 1 wherein said step of applying pressure generates said pressure by a fluid medium.

6. The method of claim 1 wherein said step of applying pressure generates said pressure by a gaseous medium.

7. The method of claim 1 wherein said step of applying pressure generates said pressure by creating a vacuum on one side of said material sheet.

8. The method of claim 1 wherein said step of applying pressure generates said pressure mechanically.

9. The method of claim 1 wherein said step of supporting includes clamping a first end and a second of said material sheet.

10. The method of claim 1 wherein said applying pressure step produces said plurality of dents having a concave shape thereby causing light reflected from each of said plurality of dents to be concentrated into a directed beam.

11. The method of claim 1 wherein said applying pressure step produces said plurality of dents having a convex shape thereby causing light reflected from each of said plurality of dents to be scattered into a diffuse pattern.

12. The method of claim 1 wherein said applying pressure step produces said plurality of dents reflecting sound, and wherein each of said plurality of dents has geometric dimensions within a range of a wavelength of a reflected sound.

13. The method of claim 1 wherein said step of curving includes punching said material sheet thereby causing sound directed to said material sheet to become scattered.

14. The method of claim 1 wherein said step of curving includes slotting said material sheet thereby causing sound directed to said material sheet to become scattered.

15. The method of claim 1 wherein said material sheet of said step of curving is with a mesh grid thereby causing sound directed to said material sheet to become scattered.

16. The method of claim 1 further comprises the step of generating said dent profiled material sheet in shape of a multi-chambered box.

17. The method of claim 1 further comprises the steps of folding, layering and bonding of said dent profiled material sheet thereby forming a sandwiched structure.

18. The method of claim 1 wherein said support elements of said supporting step are multiple-threaded helixes.

19. The method of claim 18, wherein said support elements comprise alternating right-hand and left-hand twists.

20. The method of claim 1 wherein said material sheet of said curving step has a coarse surface.

21. The method of claim 20 wherein step of curving includes placing a grid-type layer on said material sheet.

22. The method of claim 20 wherein said step of applying pressure produces said dent material sheet suitable to be used as a structural component.

23. The method of 1 further comprises the step of sandwiching a selected material between folded layers of said dent profiled material sheet, thereby forming a compound structure.

24. The method of claim 23 wherein said selected material of said sandwiching step is a recycled plastic material.

25. The method of claim 23 wherein said sandwiching step produces said compound structure with an improved sound absorption property.

26. The method of claim 23 wherein said sandwiching step produces said compound structure with an improved sound reflection property.

27. The method of claim 23 wherein said sandwiching step produces said compound structure with an improved rigidity.

28. The method of claim 1 wherein said step of applying pressure produces said dent profiled material sheet suitable to be used as a shock or energy absorber.

29. The method of claim 1 wherein said step of applying pressure produces said dent profiled material sheet suitable to be used as a heat exchanger.

30. The method of claim 1 further comprises the step of coloring a trough of each of said plurality of dents.

31. The method of claim 30 wherein said step of coloring includes coloring said trough by a flow-dynamic color transition process.

32. The method of claim 30 wherein said step of coloring includes coloring said trough by color rollers.

33. The method of claim 1 further comprising the step of heating said material sheet before said step of applying pressure.

34. The method of claim 5 wherein said fluid medium of said applying pressure step is heated.

35. The method of claim 6 wherein said gaseous medium of said applying pressure step is heated.

36. The method of claim 33 wherein said step of heating is caused by electrical heat.

37. The method of claim 1 further comprises the step of pouring a selected material under one side of said material sheet before said step of applying pressure.

38. The method of claim 1 wherein said applying pressure step produces said dent profiled material sheet suitable to be used for blow-molding plastic objects.

39. The method of claim 1 wherein said applying pressure step produces said dent profiled material sheet suitable to be used for blowing glass.

40. The method of claim 1 wherein said applying pressure step produces said dent profiled material sheet suitable to be used for foundry cores.

41. The method of claim 1 wherein said applying pressure step produces said dent profiled material sheet suitable to be used as a model to manufacture a mold by a computerized and mechanical molding process.

42. The method of claim 8 wherein said support elements of said supporting step are rings.

43. The method of claim 8 wherein said support elements of said supporting step are helical support structures.

44. The method of claim 8 wherein said applying pressure step is generated by said outer pressure sleeves which are dent-deformed.

45. The method of claim 1 wherein said applying pressure step produces dents that are multi-dimensional and staggered.

46. The method of claim 1 wherein said support elements of said supporting step are resilient rings.

47. The method of claim 1 wherein said support elements of said supporting step are flexible helixes.

48. The method of claim 1 wherein said support elements of said supporting step are chains of rings.

49. The method of claim 1 wherein resilient packs are used for spacing apart said support elements of said supporting step.

50. The method of claim 49 wherein said resilient packs are made of elastomeric soft plastics.

51. The method of claim 1 wherein said support elements of said supporting step are movable.

52. The method of claim 1 wherein said material sheet of said step of curving has a conical shape, and said support elements of said supporting step are rings, and wherein said rings being separated by a variable spacing, said variable spacing causing a constant number of staggered dents to be formed per circumference of said material sheet when equal hydraulic dent pressure is applied to said material sheet.

53. The method of claim 1 wherein said support elements of said supporting step are spherical-shaped components in a dense ball pack.

54. The method of claim 1 wherein said support elements of said supporting step are spaced-apart balls in a jacket shell.

55. The method of claim 1 wherein said support elements of said supporting step are zigzagged-shaped.

56. The method of claim 1 wherein said support elements of said supporting step are serpentine-shaped.

57. The method of claim 1 wherein said material sheet of said curving step has a plurality of segments, and wherein said applying pressure step produces at least two dents in each of said plurality of segments.

58. The method of claim 1 wherein said pressure collar means is a resilient pressure sleeve.

59. A method for producing a dent profiled material sheet, the method comprising the steps of:

providing a material sheet having a first segment, and a support roller having a plurality of spaced-apart support elements;

arching said first segment over said spaced-apart support elements of said support roller;

applying pressure on said first segment, thereby producing a plurality of indentations in said first segment in between said support elements;

releasing said pressure on said first segment; and advancing said first segment so as to be substantially disengaged from said roller.

60. The method of claim 59 wherein said providing step provides said material sheet with a second segment, and wherein said advancing step further advances said second segment for producing indentations thereto.

61. The method of claim 59 wherein said providing step provides said support elements in such shape that they cause quadrangular dents in said material sheet during said applying pressure step.

62. The method of claim 59 wherein said providing step provides said support elements in such shape that they cause pentagonal dents in said material sheet during said applying pressure step.

63. The method of claim 59 wherein said applying pressure step generates said pressure by a fluid medium.

64. The method of claim 59 wherein said applying pressure step generates said pressure by a gaseous medium.

65. The method of claim 59 wherein said applying pressure step generates said pressure by mechanical means.

66. The method of claim 59 wherein said providing step provides said support elements in shell shape.

67. The method of claim 59 further comprises the step of clamping immediately following the step of arching, wherein first and second ends of said first segment are clamped.

68. An apparatus for producing indentations in a material sheet having a first segment, the apparatus comprising:

a support roller having a plurality of spaced-apart support elements for supporting said first segment of said material sheet; and a pressure collar for applying pressure on said first segment;

wherein said first segment arches over said support roller, and said pressure collar applies pressure on said first segment, thereby produces indentations in said first segment between said support elements, and wherein subsequently said pressure collar releases said pressure on said first segment, and said first segment advances so as to be substantially disengaged from said support roller.

69. The apparatus of claim 68 wherein said material sheet has a second segment, and wherein said second segment advances onto said support roller when said first segment is disengaged from said support roller.

70. The apparatus of claim 68 wherein each of said support elements has a quadrangular shape.

71. The apparatus of claim 68 wherein said pressure collar generates said pressure by a fluid medium.

72. The apparatus of claim 68 wherein said pressure collar generates said pressure by mechanical means.

* * * * *